(12) United States Patent
Lattmann et al.

(10) Patent No.: US 6,425,099 B1
(45) Date of Patent: Jul. 23, 2002

(54) METHOD OF UPDATING AN ASSOCIATIVE MEMORY OF THE TRIE TYPE, AND ROUTER IMPLEMENTING SUCH A METHOD

(75) Inventors: Joël Lattmann, Champs sur Marne; Christian Duret, Chatillon; Hervé Guesdon, Malakoff, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/395,673

(22) Filed: Sep. 14, 1999

(30) Foreign Application Priority Data

Sep. 23, 1998 (FR) .......................................... 98 11856

(51) Int. Cl.$^7$ ................................................ G06F 11/00
(52) U.S. Cl. ...................................... 714/720; 714/799
(58) Field of Search ................................ 714/720, 811, 714/37, 799

(56) References Cited

U.S. PATENT DOCUMENTS

| | | | | |
|---|---|---|---|---|
| 5,440,547 A | * | 8/1995 | Easki et al. | 370/395.3 |
| 5,781,431 A | | 7/1998 | Duret et al. | |
| 5,909,440 A | * | 6/1999 | Ferguson et al. | 370/389 |
| 6,337,862 B1 | * | 1/2002 | O'Callaghan et al. | 370/392 |

FOREIGN PATENT DOCUMENTS

| | | |
|---|---|---|
| EP | 0 380 294 | 8/1990 |
| WO | WO 96/00945 | 1/1996 |
| WO | WO 98/27662 | 6/1998 |

OTHER PUBLICATIONS

Doeringer W. et al., "Routing on Longest–Matching Prefixes", IEEE Transactions on Networking, Feb. 1996, vol. 4, No. 1, pp.86–97.

Degermark M. et al., "Small Forwarding Tables for Fast Routing Lookups", SIGCOMM '97, Cannes, France, 1997 ACM —89791–905–X/97/0009 . . ., pp. 3–14.
Waldvogel M. et al., "Scalable High Speed IP Routing Lookups", SIGCOMM '97, Cannes, France, 1997 ACM 0–89791–905–X/97/0009 . . ., pp. 25–36.
Fredkin E., "Trie Memory", Communications of the ACM, vol. 3, No. 9, Sep. 1960, pp. 490–499.
Pei T.–B. et al., "Putting Routing Tables in Silicon", IEEE Network Magazine, Jan., 1992, vol. 6, pp. 42–50.
Dittia Z.D. et al., "Overview of Session 5 : Hardware Issues in ATM+IP Networks", Report on IP+ATM Session 5: Hardware Issues, Jan. 1997, pp. 1–6, zubin@dworkin.wustl.edu.
Srinivansan V. et al., "Fast and scalable layer four switching", ACM SIGCOMM '98 Conference. Applications, Technologies, Architectures, And Protocols For Computer Communication, Vancouver, BC, Canada, Sep. 2–4, 1998, vol. 28, No. 4, pp. 191–202.
French Preliminary Search Report dated May 28, 1999.

\* cited by examiner

Primary Examiner—Phung M. Chung
(74) Attorney, Agent, or Firm—Marshall, Gerstein & Borun

(57) ABSTRACT

An associative memory of the TRIE type is organised in the form of registers of $2^K$ cells having a portal register from which binary strings are analyzed in successive slices of K bits. Each non-empty cell contains either a pointer or a reference. This reference is issued after the analysis has followed a path formed by the cells designated by the successive slices of K bits in the registers designated by the pointers encountered in these cells in succession. The data is stored in the TRIE memory in response to commands to insert and delete binary patterns of variable length, each associated with a reference, so that when a bit string is analyzed, the reference issued is that associated with the longest of the binary patterns coinciding with the start of the string being analyzed.

29 Claims, 15 Drawing Sheets

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 |    | P1 |    |    |    |    |    |    |    |    |    |    |    |    |    |    |
| 1 | P1 |    | 3  | P1 |    |    |    |    |    |    |    |    |    |    |    |    |
| 2 |    |    |    |    | 1  |    | 4  |    |    |    | 2  |    |    |    |    |    |
| 3 | P2 | P2 | P2 | P2 | P2 | P2 | P2 | P2 | P3 | P3 | P3 | P3 | P2 | P2 | P2 | P2 |
| 4 |    |    |    |    |    |    |    |    | P4 |    |    |    |    |    |    |    |
| 5 |    |    |    |    |    |    |    |    |    |    |    |    |    |    |    |    |

FIG. 7A

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | P5 | P1 | P5 | P5 | P5 | P5 | P5 | P5 | P5 | P5 | P5 | P5 | P5 | P5 | P5 | P5 |
| 1 | P1 | P5 | 3  | P1 | P5 | P5 | P5 | P5 | P5 | P5 | P5 | P5 | P5 | P5 | P5 | P5 |
| 2 | P5 | P5 | P5 | P5 | 1  | P5 | 4  | P5 | P5 | P5 | 2  | P5 | P5 | P5 | P5 | P5 |
| 3 | P2 | P2 | P2 | P2 | P2 | P2 | P2 | P2 | P3 | P3 | P3 | P3 | P2 | P2 | P2 | P2 |
| 4 | P5 | P5 | P5 | P5 | P5 | P5 | P5 | P5 | P4 | P5 | P5 | P5 | P5 | P5 | P5 | P5 |
| 5 |    |    |    |    |    |    |    |    |    |    |    |    |    |    |    |    |

FIG. 7B

METHOD OF UPDATING AN ASSOCIATIVE MEMORY OF THE TRIE TYPE, AND ROUTER IMPLEMENTING SUCH A METHOD

BACKGROUND OF THE INVENTION

The present invention relates to associative memories and in particular memories of the <<TRIE>> type (derived from the English verb <<reTRIEve>>).

The principle of the <<TRIE>> memory was proposed by R. de la Briandais and E. Fredkin et al towards the end of the 1950s (see E. Fredkin et al.: <<Trie Memory>>, Communications of the ACM, Vol. 3, No. 9, September 1960, pages 490–499). It consists in cutting up the bit strings to be recognised into successive slices of a fixed length (of K bits) and integrating them in a two-dimensional table T. Each row of the table constitutes a register of $2^K$ elementary cells. A register (R) is assigned to each slice of the string and a cell in the register is associated with the value (V), ranging between 0 and $2^K-1$ of this slice. The contents (C=T[R,V]) of the cell determined in this manner represent either the register allocated to the subsequent slice (or pointer) or an end of analysis reference (or <<status>>) if the analysis of the string must end on this slice.

The register allocated to the first slice of the string, which is also the point of entry to the table, is also referred to as the portal register. The data to be analysed in the form of bit strings, i.e. to be compared with the contents of the TRIE memory, will also be referred to as routes hereafter. The term path will be used to denote the succession of stringed cells in the table associated with a route. Each register of the table will be said to be of order $i \geq 0$ if it is attributed to the (i+1)-th slice of one or more stored routes. The portal register will therefore be of order 0. The TRIE memory associates with each of its registers of order $i \geq 0$ a unique sequence of iK bits corresponding to the iK first bits of each route whose path in the table passes via a cell of the register in question.

The following example will provide an illustration of how data is stored in a TRIE memory in the specific case where K=4. The value of each slice is represented by a digit in hexadecimal numbering (0,1, . . . E,F) and each of the registers contains $2^4=16$ cells.

Let us assume that the routes to be recognised are those commencing with the patterns 45A4, 45AB, 67AB, 788A and 788BD, to which the statuses S0, S1, S2, S3 and S0 have been allocated respectively (a same status may be shared by several routes). By using the row index for the register R and the column index for the value V of the slices and by taking the register $R_0=0$ as the portal register, the table of the TRIE memory will appear as illustrated in FIG. 1, the underlined data being the statuses. The codes 45A4, 45AB, 67AB, 788A and 788BD are represented respectively in the table of FIG. 1 by the paths:

T[0,4]→T[1,5]→T[2,A]→T[3,4];

T[0,4]→T[1,5]→T[2,A]→T[3,B];

T[0,6]→T[4,7]→T[5,A]→T[6,B];

T[0,7]→T[7,8]→T[8,8]→T[9,A];

T[0,7]→T[7,8]→T[8,8]→T[9,B]→T[10,D].

From this example, it may be seen that all the codes starting with a common part of iK bits are represented by common a initial path in the memory, leading to the register of order i with which the sequence formed by these iK bits is associated.

If we consider a route to be analysed, cut up into a series of binary slices of values $V_i$ where $0 \leq i \leq N$ and $\{R_i\}$ is the series of registers associated with the values $V_i$, where $R_0$ still denotes the portal register, the analysis algorithm implemented may be that illustrated in FIG. 2.

On initialisation 1 of this algorithm, the rank of analysis i is set to 0 and the portal register $R_0$ is selected as the register R. In each iteration of rank i, the contents C of the cell T[R,$V_i$], denoted by the (i+1)-th slice $V_i$ of the route in the register of order i selected, is read at step 2. If this cell contains a continue analysis pointer, which will indicate at test 3 the value 1 for a bit FP(C) stored in the cell, the register of order i+1 denoted by this pointer Ptr(C) is selected as the register R for the next iteration at step 4 and the rank i is incremented. If test 3 reveals a cell which does not contain a pointer (FP(C)=0), the status Ref(C) read in the cell concerned is returned at step 5 as a result of looking up the table.

This algorithm enables routes containing any number of slices to be analysed. A same table may be used for several types of analysis, by organising the data on the basis of different portal registers. Furthermore, it enables the analysis time of the data to be controlled: analysing a number N of slices of K bits will require at most N times the duration of one iteration.

The algorithm of FIG. 2 may be implemented very rapidly by a hardware component controlling the accesses to the memory array. In particular, it will enable high-performance routers to be set up for packet-switched telecommunications networks. The header of the packets is analysed by the component on the fly and the status associated with a route designates, for example, an output port of the router to which the packets bearing a destination address conforming to this route must be routed.

Such a router may be a multi-protocol router. This being the case, the different sections of the header are analysed on the basis of different portal registers. For example, a first analysis of a header field (or several) indicating the protocol used and/or the version of this protocol may be analysed from a first portal register. This first analysis will provide a reference which, although corresponding to a logical end of the analysis, may be incorporated in the TRIE memory by a continue analysis pointer denoting another portal register to be used for analysing the rest of the header. The reference in question may also trigger time delays or skips by a given number of bits in the header being analysed in order to be able to choose which portion of the header should be analysed next. In practice, a certain number of analyses are generally run in succession in order to trigger the operations required by the protocols supported, depending on the content of the headers. One of these analyses will relate to the destination addressed needed to complete the routing function strictly speaking.

A router of the type outlined above is described in French patent 2 707 775. On the subject of using a TRIE memory in routers, reference may be made to the article <<Putting Routing Tables in Silicon>> by T. B. Pei et al., IEEE Network Magazine, January 1992, pages 42–50.

The Internet Protocol (IP) is one of the communication protocols which may be supported by the router.

The IP routing process is essentially based on analysing the destination addresses of level 3 of the protocol (see C. Huitéma: <<Le Routage dans l'Internet>>, Editions Eyrolles, 1995). The addresses of the frames to be routed are inscribed in an internal management table, called a routing table or <<forwarding table>>, where they are associated with parameters which characterise the accesses to which they are directed. In its broad lines, the routing operation consists in comparing the addresses carried by the incoming frames with those contained in the table and directing them to the correct interface.

Most of the addresses are declared in what is referred to as an aggregate form. An aggregate describes a set of addresses by means of the data in a common header and a mask which sets the bit length of the part of the address to be analysed. This presentation of the data in the table is very much linked to the way in which addresses are assigned, associating an aggregate to a sub-network or a set of sub-networks and hence implicitly a geographical location. These aggregates may contain specific details for some of their addresses which require a specific routing.

For example, if representing the addresses in hexadecimal format, the data to be stored in a routing table may of the type:

4A0, mask 10→Port P1;

4A2, mask 12→Port P2;

4A28, mask 14→Port P3.

This gives an orientation code for the addresses analysed, prefixed by the underlined binary patterns below:

0100 1010 00XX, etc., direct to port P1, 0100 1010 0010 XXXX, etc. direct to port P2, 0100 1010 0010 10XX, etc. direct to port P3.

This specification provided by the longest patterns is known under the name of <<longest match>> management. It is known that this management complicates the routers used significantly (see the articles: <<Routing on Longest-Matching Prefixes>>, by W. Doeringer et al., IEEE/ACM Trans. on Networking, Vol. 4, No. 1, February 1996, pages 86–97; <<Small Routing Tables for Fast Routing Lookups>> by M. Degermark et al., Proc. of the SIGCOMM' 97 Conference, Cannes, France, 1997, pages 3–14; <<Scalable High Speed Routing Lookups>>, by M. Waldvogel et al., Proc. of the SIGCOMM' 97 Conference, Cannes, France, 1997, pages 25–36.

A priori, the TRIE memory is well suited to the routing table function in an IP frame routing process. The concept of pattern is equated with the concept of an address to be recognised and the status may carry the information needed to direct the data.

However, the algorithms used to keep the contents of the TRIE memory up to date do not satisfactorily meet the constraints imposed by the <<longest match>> management. For example, inserting both a status S0 which is valid for the pattern $V_0, \ldots V_N$, and another status S1 which is valid for the longer pattern $V_0, \ldots V_N, V_{N+1}, \ldots, V_P$ in the TRIE table is critical. Furthermore, these algorithms generally assume that the binary data to be analysed is of a length. which is a multiple of the size K of slices, which is not the case when managing an IP routing table whose masks may of be of any length.

SUMMARY OF THE INVENTION

One object of the invention is to overcome the practical limitations encountered with TRIE memories and in particular to enhance the possibilities offered by routers using these memories.

Accordingly, the invention proposes a method of updating an associative memory of the TRIE type organised in the form of a set of registers of $2^K$ cells having at least one portal register from which bit strings are analysed in successive slices of K bits, K being an integer at least equal to 1. Each non-empty cell of the TRIE memory contains data incorporating either a continue analysis pointer or a reference. The TRIE memory associates an integer order $i \geq 0$ and a respective sequence of iK bits with each register. The analysis of a bit string consists of at least one iteration of rank i, starting from the rank i=0 for which the portal register of order 0 is selected, whereby the iteration of rank i comprises the steps of:

reading data in a cell of the register of order i selected, denoted by the (i+1)-th slice of K bits in the string analysed;

if the data read contains a continue analysis pointer, selecting a register of order i+1 of the TRIE memory as indicated by said pointer, the sequence associated with the register of order i+1 selected being formed by the first (i+1)K bits of the string analysed, then running the iteration of rank i+1;

if the data read represents end analysis data and contains no continue analysis pointer, terminating the analysis by issuing a reference contained in said end analysis data.

According to the invention, the data are stored in the cells of the TRIE memory in response to commands to insert and delete binary patterns of variable length each associated with a reference, so that when a bit string is being analysed, the reference issued will be that associated with the longest of the binary patterns matching the start of the string analysed.

Two auxiliary tables may also be used for updating purposes: a mirror table which reflects the contents of the TRIE memory and a ghost table storing the references associated with the binary patterns inserted.

The mirror table is made up of registers of $2^K$ cells, each corresponding to a respective register of the TRIE memory allocated to the portal register. Each of the $2^K$ cells of a register in the mirror table then corresponds to a respective cell in the corresponding register of the TRIE memory. Each cell in the mirror table corresponding to a non-empty cell of a register of order $i \geq 0$ of the TRIE memory contains at least:

information indicating whether the corresponding cell of the TRIE memory contains a continue analysis pointer;

if the corresponding cell of the TRIE memory contains a continue analysis pointer, the continue analysis pointer in question;

if the corresponding cell of the TRIE memory does not contain a continue analysis pointer but a reference, the length of a binary pattern associated with this reference;

and, preferably, information indicating whether the corresponding cell in the TRIE memory is ghosted, i.e. whether, for at least one integer depth D such that $0 \leq D < K$, a pattern of (i+1)K–D bits has been inserted, the first iK bits of which form the sequence associated with said register of order i and the last K–D bits of which correspond to the first K–D of the K bits denoting said corresponding cell of the TRIE memory within said register of order i.

For each ghosted cell of a register of order $i \geq 0$ in the TRIE memory, the ghost table stores each reference associated with an inserted pattern of (i+1)K–D bits, such that $0 \leq D < K$, the first iK bits of which form the sequence associated with said register of order i and the last K–D bits of which correspond to the first K–D of the K bits denoting said ghosted cell of the TRIE memory within said register of order i.

To respond to a command to insert a first pattern of L=MK+B bits associated with a first reference, where M and B are integers such that $M \geq 0$ and $1 \leq B \leq K$, it is of advantage to run the following operations:

selecting the portal register of order 0;

if M>0, proceeding with the following steps /a/ to /e/ for each of the values of the rank i increasing from 0 to M–1:

/a/ reading the data in a first cell of the mirror table corresponding to the cell of the TRIE memory indicated by the (i+1)-th slice of K bits of the first pattern within the register of order i selected;

/b/ if the data read in the first cell indicates that the corresponding cell of the TRIE memory contains a continue analysis pointer, selecting the register of the TRIE memory designated by said pointer as the register of order i+1;

/c/ if the data read in the first cell indicates that the corresponding cell of the TRIE memory does not contain a continue analysis pointer, selecting a register available in the TRIE memory as a register of order i+1, writing in the corresponding cell of the TRIE memory a continue analysis pointer designating the selected register of order i+1 and writing in the first cell of the mirror table an indication that the corresponding cell of the TRIE memory contains a continue analysis pointer as well as said pointer;

/d/ if a second reference, associated with a second binary pattern, was previously obtained, writing said second reference in each non-ghosted cell of the TRIE memory belonging to the register of order i selected and not containing a pointer and write the length of said second binary pattern in each corresponding cell of the mirror table;

/e/ if the data read in the first cell indicates that the corresponding cell of the TRIE memory is ghosted, obtaining from the ghost table a second reference associated with a second binary pattern constituted by the inserted pattern of (i+1)K−D bits having a minimum depth D, the first iK bits of which form the sequence associated with the register of order i selected and the last K−D bits of which correspond to the first K−D bits of the K bits denoting said ghosted cell within the register of order i selected;

proceeding with the following steps /f/ to /j/ for each slice of K bits of the form $2^{K-B}V_M+Z$ where $V_M$ is the number formed by the last B bits of the first pattern and Z is an integer ranging between 0 and $2^{K-B}-1$:

/f/ reading data in a second cell of the mirror table corresponding to the cell of the TRIE memory denoted by said slice $2^{K-B}V_M+Z$ within the register of order M selected;

/g/ if the data read in the second cell indicates that the corresponding cell of the TRIE memory is ghosted, obtaining from the ghost table the length of the inserted pattern of (M+1)K−D bits having a minimum depth D, the first MK bits of which form the sequence associated with the register of order M selected and the last K−D bits of which correspond to the first K−D bits of the K bits designating said ghosted cell within the register of order M selected and do not run steps /h/ to /j/ if the depth obtained is less than K−B;

/h/ if the data read in the second cell indicates that the corresponding cell of the TRIE memory is not ghosted, writing in the second cell of the mirror table an indication that the corresponding cell of the TRIE memory is ghosted;

/i/ if the data read in the second cell indicates that the corresponding cell of the TRIE memory contains a continue analysis pointer, recursively propagating the first reference associated with the first binary pattern starting from the register designated by said continue analysis pointer;

/j/ if the data read in the second cell indicates that the corresponding cell of the TRIE memory does not contain a continue analysis pointer, writing said first reference in said corresponding cell of the TRIE memory and write the length of said first binary pattern in the second cell of the mirror table;

writing in the ghost table the first reference, in relation with the depth K−B for each cell of the TRIE memory designated by a slice of K bits of the form $2^{K-B}V_M+Z$, where Z is an integer ranging between 0 and $2^{K-B}-1$; and running step /d/ for the rank i=M.

Furthermore, in order to respond to a command to delete a first pattern of L=MK+B bits associated with a first reference, where M and B are integers such that M≧0 and 1≦B≦K, it is advantageous to run a recursive procedure, starting from rank i=0 for which the portal register of order 0 is selected, whereby said recursive procedure comprises nested iterations for the ranks i≧0 and each iteration of rank i≧0 comprises the operations of:

if i<M, proceeding with the following steps /a'/ to /h'/:

/a'/ selecting for the rank i a first cell of the mirror table corresponding to the cell of the TRIE memory denoted by the (i+1)-th slice of K bits of the first pattern within the register of order i selected and reading data in the first cell selected for rank i;

/b'/ if the data read in the first cell selected for rank i indicates that the corresponding cell of the TRIE memory is ghosted, obtaining from the ghost table a second reference associated with a second binary pattern constituted by the inserted pattern of (i+1) K−D bits having a minimum depth D, the first iK bits of which form the sequence associated with the register of order i selected and the last K−D bits of which correspond to the first K−D bits of the K bits denoting said ghosted cell within the register of order i selected;

/c'/ selecting as a register of order i+1 a register of the TRIE memory designated by a continue analysis pointer included in the data read;

/d'/ performing the iteration of rank i+1;

/e'/ writing in the first cell of the mirror table selected for the rank i an indication that the corresponding cell of the TRIE memory does not contain a continue analysis pointer;

/f'/ if a second reference associated with a second binary pattern was previously obtained, writing said second reference in the cell of the TRIE memory corresponding to the first cell selected for rank i and write the length of said second binary pattern in the first cell selected for rank i;

/g'/ if no second reference was previously obtained, writing in the first cell selected for rank i an indication that the corresponding cell of the TRIE memory is empty;

/h'/ if i>0 and each cell of the register of the mirror table corresponding to the register of order i selected indicates that the corresponding cell of the TRIE memory does not contain a continue analysis pointer and is not ghosted, making the register of order i selected available;

if i=M, deleting the reference associated with the first binary pattern of the ghost memory for the cell of the TRIE memory denoted by the slice of K bits $2^{K-B}V_M$ from the register of order M selected for the rank M where $V_M$ is the number formed by the last B bits of the first pattern and proceed with the following steps /i'/ to /l'/ for each cell of the TRIE memory designated by a slice of K bits of the form $2^{K-B}V_M+Z$, where Z is an integer ranging between 0 and $2^{K-B}-1$:

/i/ looking up the ghost table to determine whether it contains, for said cell denoted by the slice $2^{K-B}V_M+Z$, at least one reference associated with a third binary pattern of a depth at least equal to K−B and, as applicable, selecting the third binary pattern of minimum depth;

/j/ if the ghost table does not contain a reference for said cell denoted by the slice $2^{K-B}V_M+Z$, writing in the corresponding cell of the mirror table an indication that said cell denoted by the slice $2^{K-B}V_M+Z$ is not ghosted and, if a second reference associated with a second binary pattern was previously obtained, selecting said second binary pattern as the third binary pattern;

/k/ if a third binary pattern has been selected and if said cell designated by the slice $2^{K-B}V_M+Z$ contains a continue analysis pointer according to the data read in the corresponding cell of the mirror memory, recursively propagating a third reference associated with the selected third binary pattern starting from the register designated by said continue analysis pointer, taking account of the length of the first binary pattern;

/l/ if a third binary pattern has been selected and if said cell designated by the slice $2^{K-B}V_M+Z$ does not contain a continue analysis pointer according to the data read in the corresponding cell of the mirror memory, writing in the cell of the TRIE memory denoted by said slice $2^{K-B}V_M+Z$ a third reference associated with the third binary pattern selected and writing the length of the selected third binary pattern in the corresponding cell of the mirror table.

Another aspect of the present invention relates to a packet processing device such as a packet router, having circuitry for analysing the header of packets received, using an associative memory of the TRIE type, and means for updating the TRIE memory operating in accordance with a method such as that defined above.

BRIEF DESCRIPTION OF THE DRAWINGS

FIGS. 3A to 7A show examples of how a TRIE memory is filled.

FIGS. 3B to 7B are based on the examples given in FIGS. 3A to 7A and show in addition the contents of an associated ghost table.

DESCRIPTION OF PREFERRED EMBODIMENTS OF THE INVENTION

Figures 1, 2:
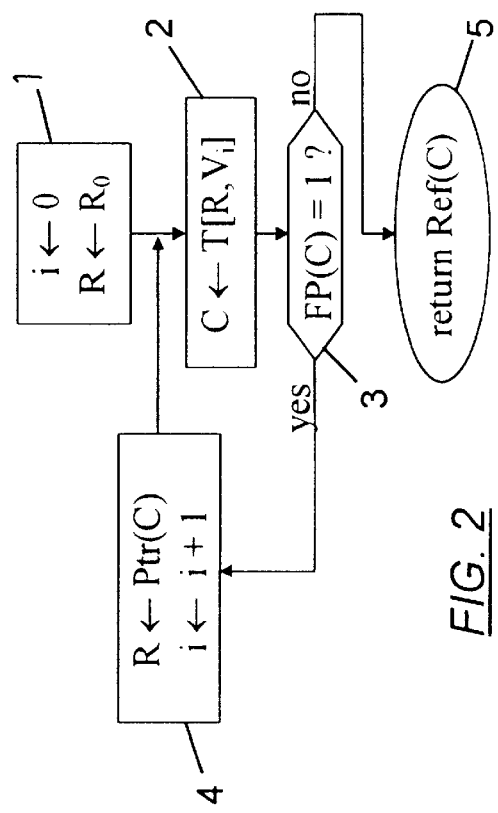
FIG. 1, described above, illustrates an example of the contents of a TRIE memory.
FIG. 2, described above, is a flow chart illustrating the analysis procedure run in order to look-up the TRIE memory.
Figure 6B:
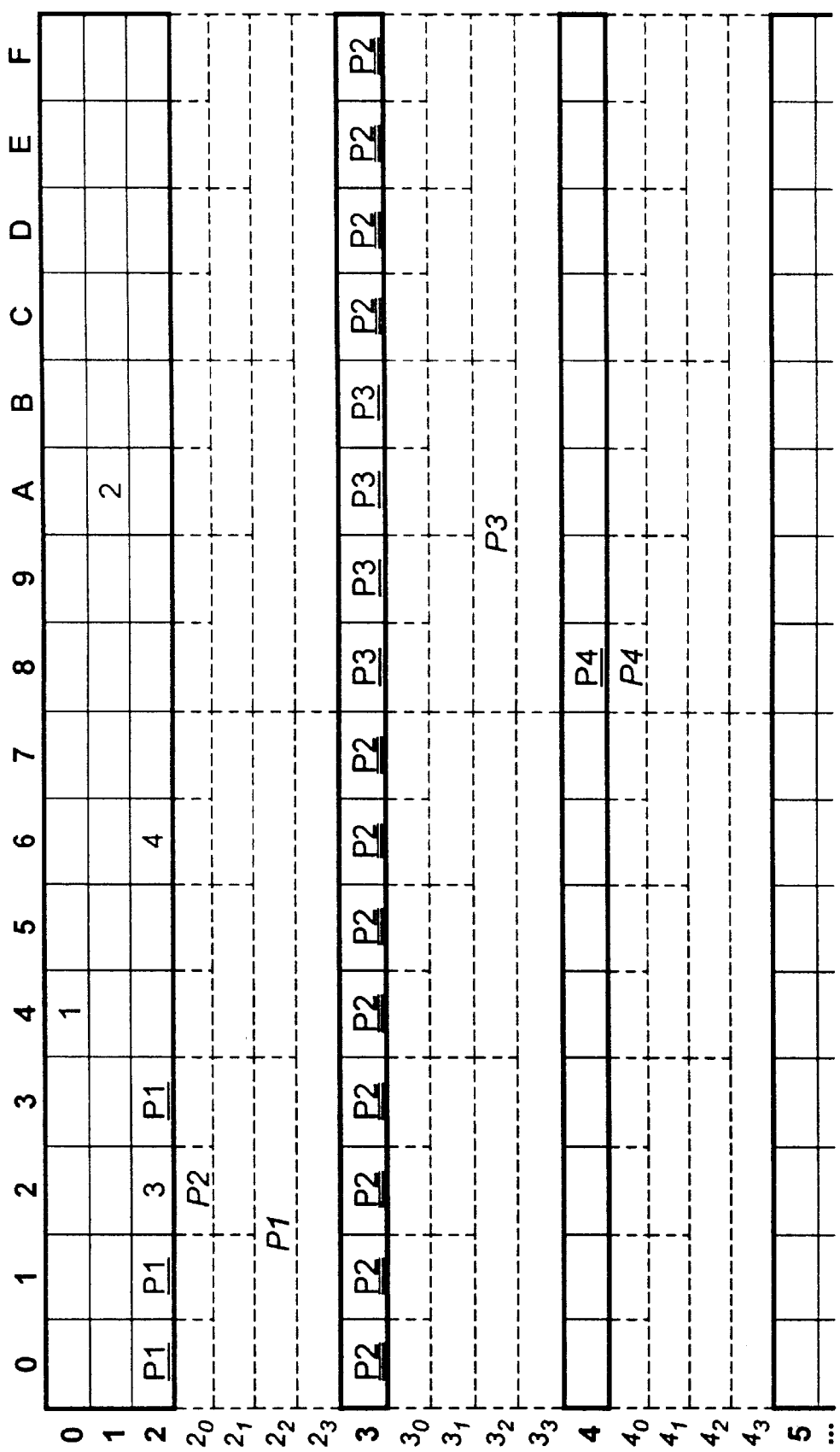

Examples 1 to 5 below, illustrated by FIGS. 3 to 7 respectively, illustrate, in a situation where K=4, how different binary patterns are integrated successively in a TRIE memory as proposed by the invention, complying with correct <<longest match>> management.

EXAMPLE 1

Inserting the Pattern 4A0, Mask 10→Port P1

Figures 3A, 3B:
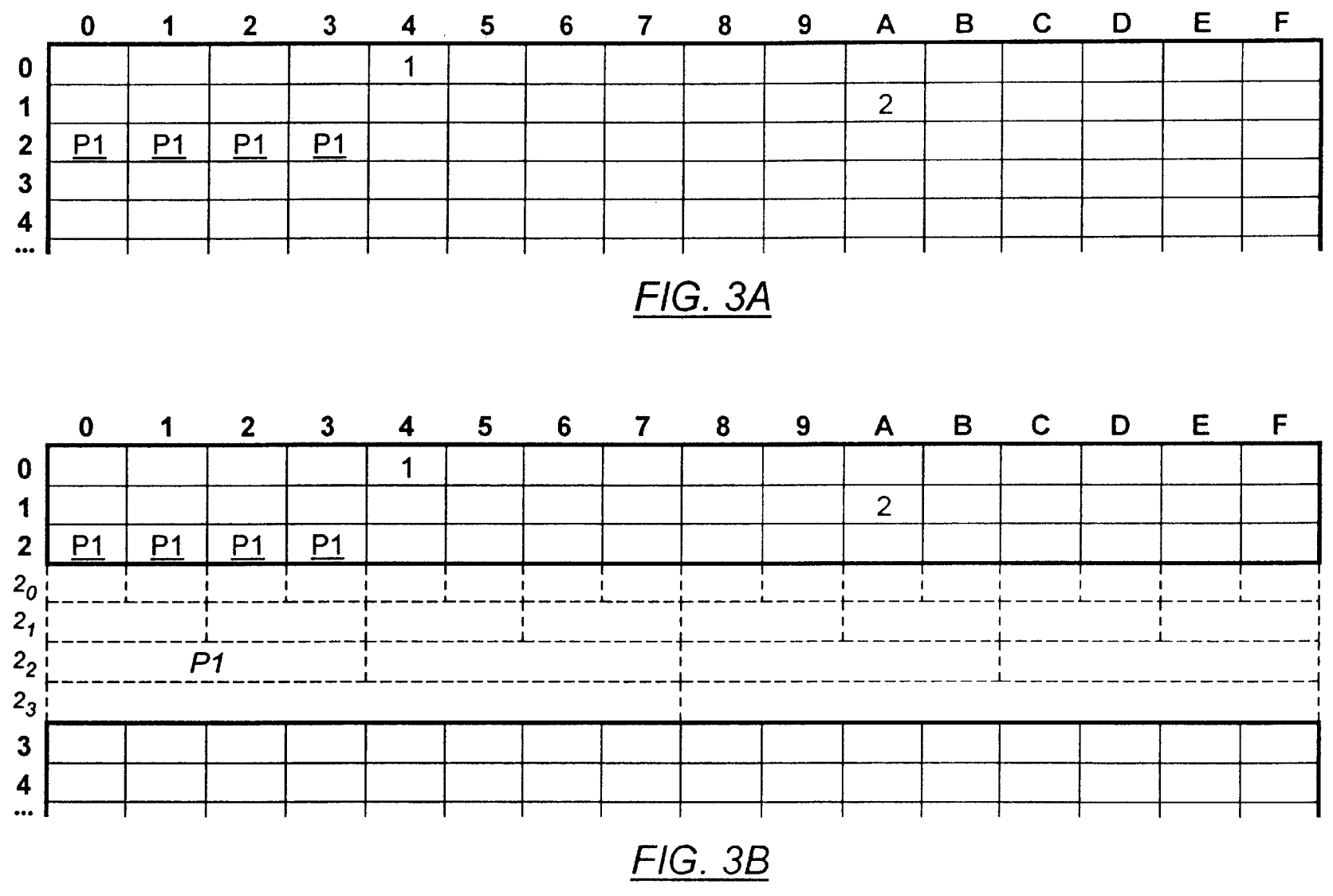

In the situation illustrated in FIG. 3A, the mask does not coincide with a slice boundary. In order to represent the binary pattern (0100 1010 00), it is necessary to develop it on all the values which might complete the alignment. This gives the set of routes 0100 1010 00XX where $X \in \{0,1\}$. The last slice of each of these routes determines the indices of the four cells (0000), (0001), (0010), (0011) of the register 2 which contain the status P1. The statuses inscribed in the given cells by developing an incomplete slice will be called explicit statuses. The explicit statuses are denoted by underlining in FIGS. 3 to 7.

EXAMPLE 2

Inserting the Pattern 4A2, Mask 12→Port P2

Figures 4A, 4B:
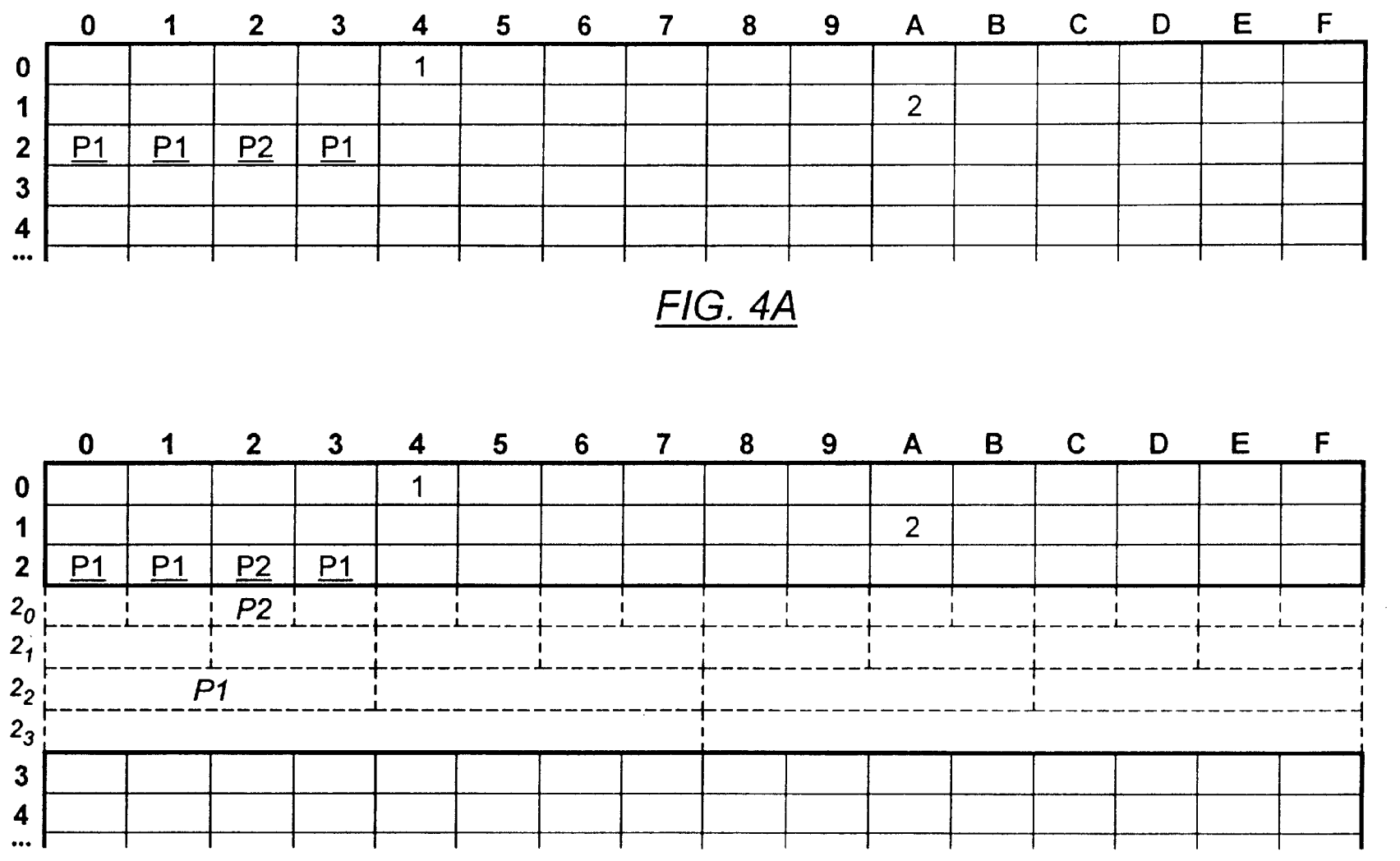

In the situation shown in FIG. 4A, the integrated pattern (0100 1010 0010). takes the same path in the memory but is longer than the preceding pattern and it ends on a boundary between analysis slices. It is sufficient to replace the status contained in the cell indexed by the value of the last slice with P2. The statuses which are associated with patterns in this manner are also called explicit statuses. It should be pointed out that if the order of examples 1 and 2 had been reversed, the pattern (0100 1010 00) would have been inserted complying with the status P2 corresponding to a longer pattern. Generally speaking, the order in which the different patterns given in the examples are inserted does not affect the final content of the TRIE memory.

EXAMPLE 3

Inserting the Pattern 4A28, Mask 14→Port P3

Figures 5A, 5B:
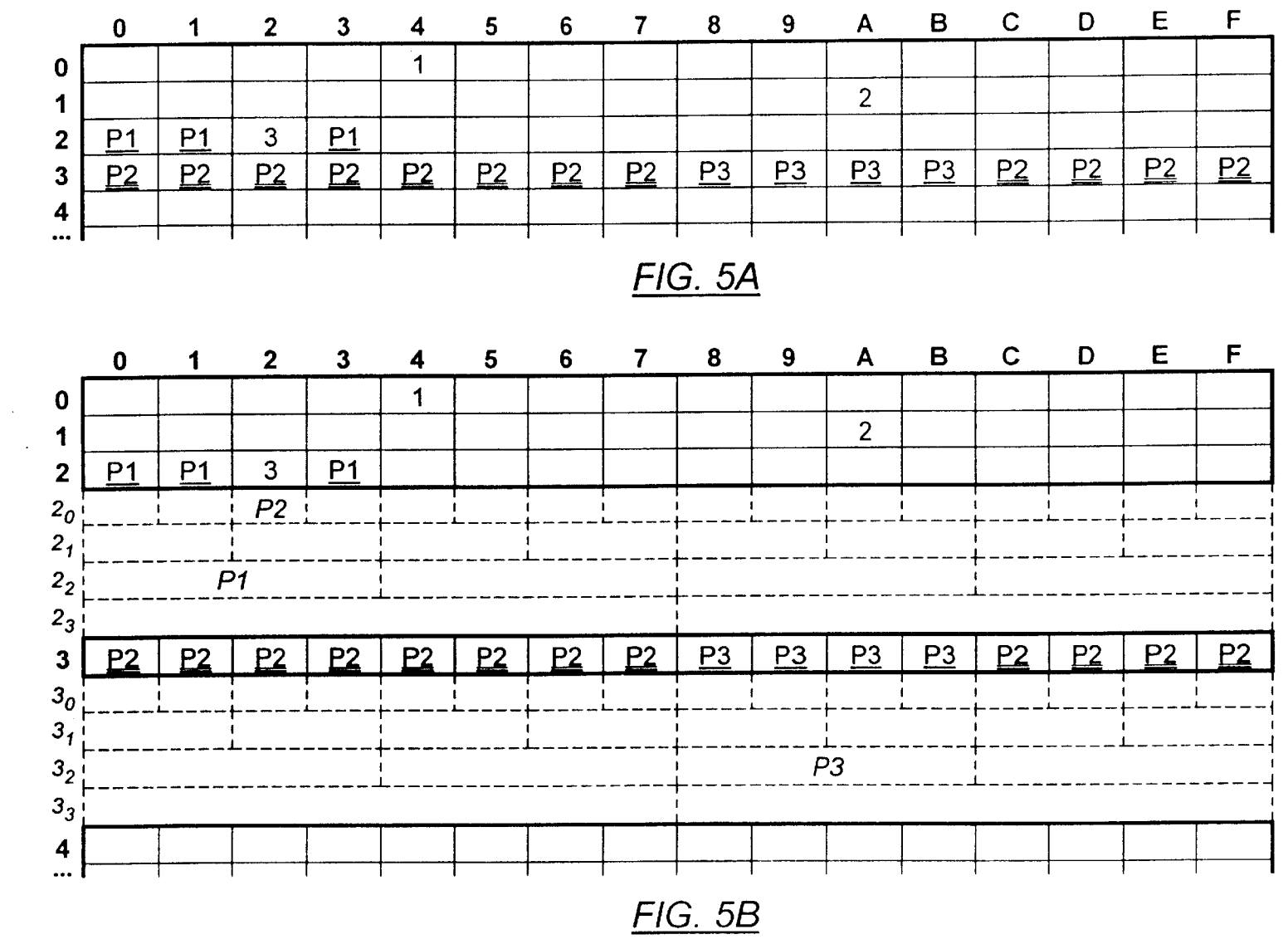
Figure 7B:
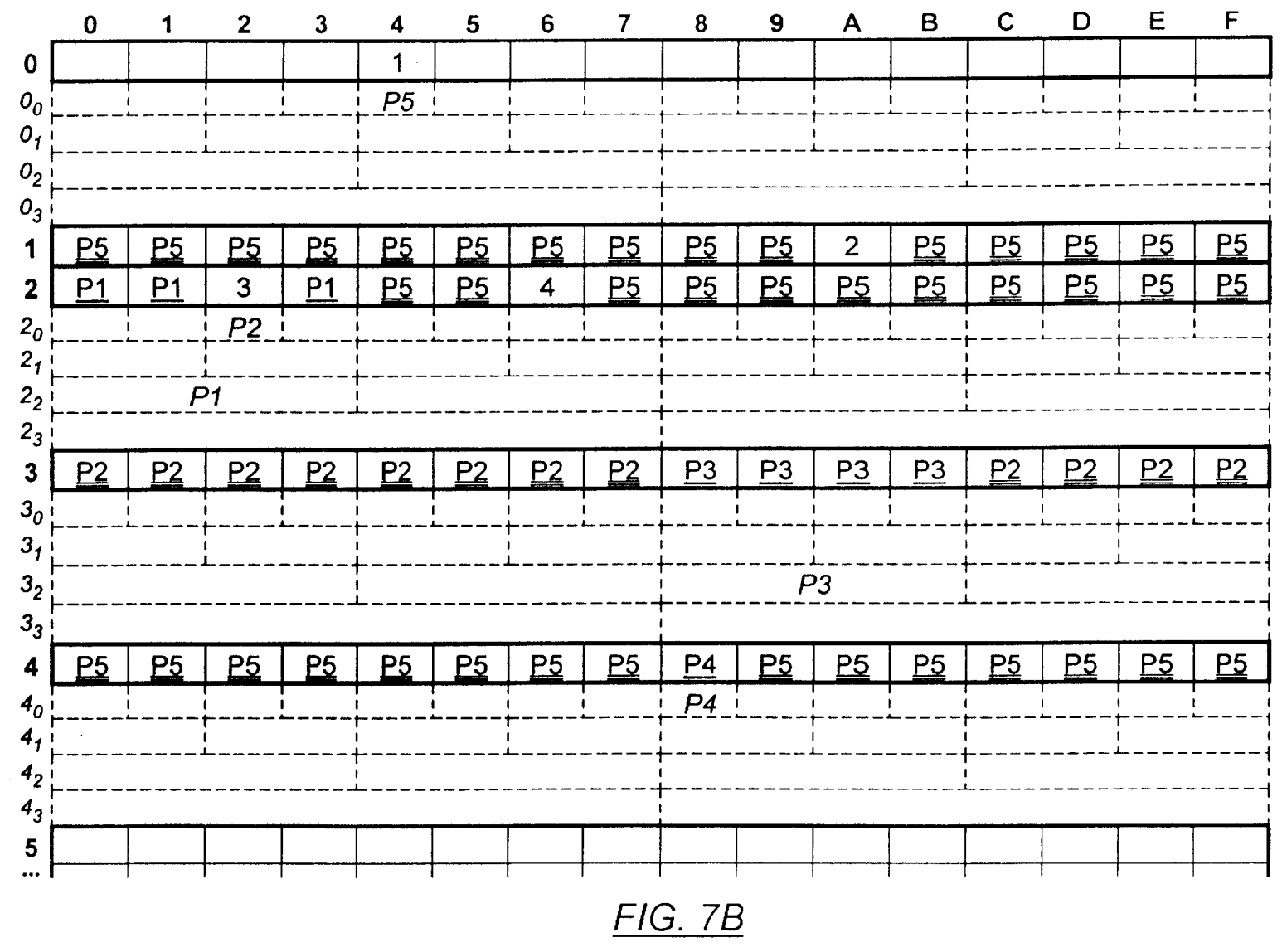

In the case illustrated in FIG. 5A, the length of the integrated pattern exceeds the alignment of the last slice of the preceding patterns. Initially, the pattern is integrated without taking account of the statuses which exist on its path through the memory. In register 2, the status P2 is therefore replaced by a pointer to register 3. The status P3 is then associated with all the patterns of the form 4A2X, where $8 \leq X \leq B$, in line with the principle illustrated in example 1. The paths which lead to the status P2 will then have to be characterised. As may be seen, they correspond to the set of 16-bit patterns which start with the hexadecimal values 4A2 to the exclusion of those already used to describe the longest pattern 4A28, mask 14. This is the set {4A2X, where $0 \leq X<8$ or $B<X \leq F$}. The status P2 is inscribed in the cells corresponding to register 3. Statuses of this type, which result from a propagation of a deleted status in the TRIE memory, will be called implicit statuses. The implicit statuses are denoted by double-underlining in FIGS. 5 to 7.

EXAMPLE 4

Inserting the Pattern 4A68, Mask 16→Port P4

The method used to insert this pattern is the same as the insertion method used in the case of example 1, the status P4 being inscribed in a single cell only since the pattern is of a length which is a multiple of K. The resulting contents of the TRIE memory are illustrated by FIG. 6A.

EXAMPLE 5

Inserting the Pattern 4, Mask 4→Port P5

In the case of pattern 4 (FIG. 7A), there are longer patterns already present in the memory. Since it is not possible to associate a status with a cell ending this pattern because it must carry a pointer, it is necessary to save the <<implicit>> paths leading to the status P5. This status will therefore be propagated and inscribed as an implicit status on the registers allocated to the paths which pass through this cell and were previously saved, i.e. to the paths describing the patterns 4A0, 4A2, 4A28 and 4A68. As the pattern 4A28 has already been processed as being a pattern that is longer than 4A2, the status P2 has already been propagated on register 3. The implicit statuses P5 therefore affect only the registers allocated on the portion of path describing the passage from pattern 4 to pattern 4A2, i.e. registers 1 and 2 as well as the registers which describe the passage from pattern 4 to pattern 4A68 which are the registers 1, 2 and 4.

The examples given above can be generalised by describing the rules which apply to the data inscribed in the memory and which deal with the above-mentioned constraints. Let us look at patterns of any length and incorporate the <<longest match>> concept.

Let a pattern $V_0$ of status S and length L be expressed by a binary sequence $b_0, \ldots, b_{L-1}$ where $b_k \in \{0,1\}$ for $0 \leq k < L$. Let us assume that $L=MK+A$ where A and M are integers and $0<A \leq K$. The pattern $V_0$ is represented in the form of M+1 slices having respective values $V_0, \ldots, V_M$, the last of which, of a value $V_M$, has A bits. A pattern of this type is represented in a TRIE table by $2^{K-A}$ paths, the first M slices of which, having respective values $V_0, \ldots, V_{M-1}$, are represented on a common path leading to a register of order M associated with the corresponding sequence of MK bits, and the last slice of which, truncated to A bits, is represented by the status S in the cells of this register indexed by $V_M \cdot 2^{K-A}+Z$ where $0 \leq Z < 2^{K-A}$ (example 1). If the register is cut up into $2^A$ groups of $2^{K-A}$ contiguous elementary cells, it will be seen that the status S occupies all the elementary cells of one of these groups, indexed by $V_M$. These groups will be called virtual cells.

It may be that the different statuses must occupy virtual cells which overlap, although it should be pointed out that non-empty intersecting virtual cells are always such that one of the two is included in the other. In this case, by convention, the status to be taken into account for the analysis and written to the table, called the active status, is the one corresponding to the longest pattern, i.e. according to the foregoing, the one whose value of A is the greater whereby the virtual cell of size $2^{K-A}$ is the narrowest.

This introduces a concept of hierarchy into the virtual cells, quantified by the value $D=K-A$ ($0 \leq D < K$) called depth. The highest priority is given to the status inscribed in the virtual cell of smallest depth. This problem of priority assigned to the longest pattern makes it necessary to characterise the contents of the memory cells more generally.

To this end, a function $\lambda(R,V)$ may be used, having non-negative integer values, defined by the following equations for each cell $T[R,V]$ of each register R of the TRIE memory ($0 \leq V < 2^K$):

$\lambda(R,V)=0$ if $T[R,V]=0$ (it is assumed, here, that the content of the empty memory cells is zero);

$\lambda(R,V)=\Lambda$ if $T[R,V]$ contains a status, explicit or implicit, coming from the insertion a pattern of length $\Lambda$;

$\lambda(R,V)=\infty$ if $T[R,V]$ contains a continue analysis pointer.

By exploiting the definition of the function $\lambda$ and working on the basis of the above-mentioned hypotheses, inserting the status S must satisfy the following condition for any cell V of the register $R_M$ of order M of the associated path such that $V_M 2^{K-A} \leq V < (V_M+1)2^{K-A}$:

$$\text{if } L \geq \lambda(R_M,V), \text{ then } T[R_M, V]=S \tag{R1}$$

Let us consider the pattern $v_0$ defined above, as affected by a longer pattern $v_1$ of a length L'>L and a status S', cut into slices of values $V'_0, \ldots, V'_M, \ldots, V'_N$ (where N>M), the last slice of which, having a value $V'_N$, has B bits. $R'_M, \ldots, R'_N$ are the registers of order M to N allocated to the slices $V'_M, \ldots, V'_N$. It may be noted that the pattern $v_1$ is not a <<longer pattern>> relative to the pattern $v_0$ unless on the one hand $R'_M=R_M$ and on the other hand the cell of coordinates $R_M, V'_M$ is located in the virtual cell indexed by $V_M$ on the register $R_M$ (examples 2 and 3).

The distribution of data in the TRIE memory must satisfy the following conditions for $0 \leq Z < 2^K$ and $V_N 2^{K-B} \leq V' < (V_N+1)2^{K-B}$:

$$T[R_M, V'_M]=R_{M+1} \tag{R2}$$

$$\text{if } L' \geq \lambda(R_N, V'), \text{ then } T[R_N, V']=S' \tag{R3}$$

$$\text{if } L \geq \lambda(R_N, Z), \text{ then } T[R_N, Z]=S \tag{R4}$$

If N>M+1, there is the following additional condition:

$$\forall i \in [M+1, N-1]: T[R_i, V_i]=R_{i+1} \text{ and if } L \geq \lambda(R_i, Z), \text{ then } T[R_i, Z]=S \tag{R5}$$

Equation (R2) expresses the fact that the status contained in the cell indexed by $V'_M$ is replaced by a pointer on the next register, the inscription of a pointer taking priority over the inscription of any status. The condition (R5) describes the propagation of the status S across all the free cells of the registers $R_{M+1}$ to $R_{N-1}$ if there are any. The condition (R3) characterises the contents of the virtual cell indexed by $V_N$ on the register $R_N$, complying with rule R1. The condition (R4) describes the propagation of the status S on the register $R_N$ (example 3). The function $\lambda$ prevents this status from being inscribed in the virtual cell indexed by $V_N$ which contains S'.

It may be noted that if the pattern $v_1=V_0, \ldots, V_N$ defined above is itself affected by a longer pattern, $v_2=V_0, \ldots, V_P$ (P>N), of status S", applying rules R2 to R5 will lead to completing the memory, on the slices M+1 to N, M+1 to P and N+1 to P, with the implicit status S in the registers $R_{M+1}$ to $R_N$ and S' in the registers $R_{N+1}$ to $R_S$.

It should be pointed out that these rules describe only the constraints of implanting data in the memory.

However, they also serve as a thread leading to the algorithms for updating patterns, which must comply with each of the steps of their procedure.

The procedures for managing paths when inserting and deleting patterns in the memory translate the above-mentioned rules. They are based on a set of data structures outlined below.

With regard to deleting patterns, it should be noted that although some of the data updating the memory can be recalculated from the context and the masks associated with the statuses, there are also configurations which can not be restored from these data alone. This is the case, for example, with statuses totally overlapped and then uncovered in full or in part by the patterns that are deleted. For example, if the patterns 4A0 and 4A2, both of mask 11 and having respective statuses of P2 and P3, are inserted in the table of FIG. 3A obtained in the case of example 1, it will be seen that the status P1 is completely overlapped without however having been explicitly deleted. Deletion of one of the patterns of mask 11 should reveal the overlapped status P1, which will not allow an examination of the contents only of the TRIE memory.

It may be noted that such restorations do not necessarily comply with the rules by which the patterns were embedded in the table. In effect, it would be possible to interpret the total overlap of a status as being the disappearance of the associated pattern without this being detrimental to the consistence of the data. It is simply a choice of running algorithms which will guarantee the non-regression of the semantic contents of the memory.

Maintaining the full context of the memory means that the concept of virtual cell has to be <<physically>> implanted in the algorithms. To this end, each register R in which at least one status has been the object of an insert command is assigned a table of K virtual registers or ghost registers.

Together, these ghost registers form what is referred to as the ghost table. Each of the ghost registers is indexed by the register R to which it refers and by its depth D, defined as being an integer such that $0 \leq D < K$ and it contains $2^{K-D}$ ghost cells GT[R,V,D] which represent the $2^{K-D}$ virtual cells indexed by the possible values V of the last slice, of length B=K−D, of the pattern to be integrated. The contents of each real cell of a register are the contents of the virtual cell to which it belongs and hence the corresponding non-empty ghost cell with the smallest depth in its ghost table.

FIGS. 3B to 7B show details of the contents of the ghost table for examples 1 to 5. Under each of the registers R concerned, the contents of which are those shown in the corresponding FIGS. 3A to 7A, are represented by broken lines whilst the contents of the associated K=4 ghost registers $R_D$ where $0 \leq D < K$ are shown in italics.

In fact, the use of the ghost table significantly simplifies the algorithms used to manage the status overlaps in general, even in cases where the context of the TRIE table is sufficient.

Let us take example 3 (FIGS. 5A and 5B). Writing a pointer to the cell T[2,2] on register 3 gives rise, in the TRIE table, to the propagation of the overlapped status P2, in the form of implicit status in register 3. Restoration of the context, if the pattern 4A28, mask 14 (status P3) has been deleted, will require restoration of the cell value T[2,2] and hence an analysis of the provenance of the propagated status P2. It would be possible to reason starting from the associated mask, which has a value of 12 and which indicates that it originates from the third register (register of order 2) of the path on which the propagation was applied. However, embedding a search of this type in an algorithm would be complex and costly in terms of computing time. It is much easier to transfer the <<ghost>> of P2, read from the ghost register $2_0$, to the cell T[2,2] then propagate the <<absence>> of P2 along the paths on which it was inscribed.

Figure 8:
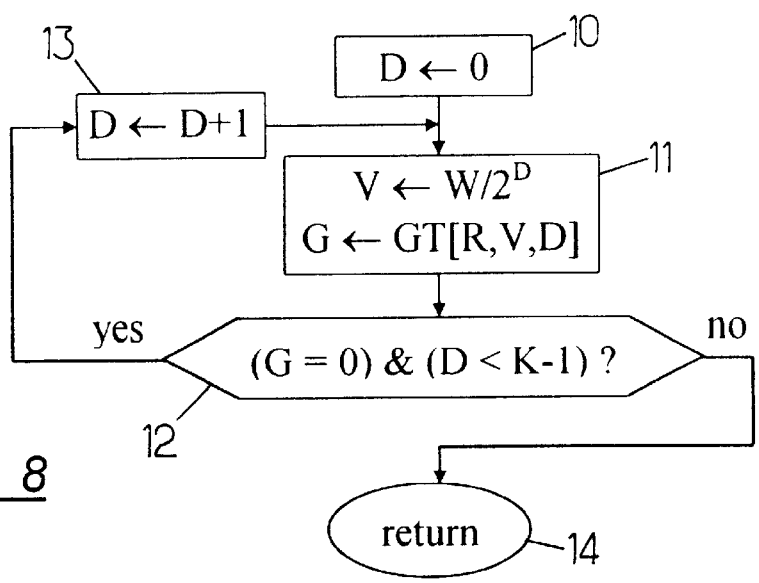
FIG. 8 is a flow chart illustrating a procedure run in order to look-up the ghost table.

The chart given in FIG. 8 illustrates one way of looking up the ghost table in order to recover, for a given cell T[R,W] of the TRIE memory, the contents of the ghost cell GT[R,V,D], which represent the virtual cell of minimum depth including the cell T[R,W] in question. Hereafter, this procedure will be denoted as Ghost(R, W, GD). It may be run in the form of a function called up by the coordinates R,W of the cell concerned in the TRIE memory and returning the associated ghost status G of minimum depth as well as this depth D (the underlined arguments of the Ghost function and the other functions considered below represent the values returned as a result of this function whilst the non-underlined functions represent values which are not modified by the function).

On initialisation 10 of the procedure Ghost(R, W, GD), the depth D is initialised at 0. For each depth D examined, the index V of the virtual cell of depth D containing the cell T[R,W] is determined in step 11, i.e. $V=W/2^D$ (V corresponds to the highest weighted K−D bits of W) and the contents GT[R,V,D] of the corresponding cell of the ghost cell are loaded into the variable status G. These contents are set to 0 if the cell GT[R,V,D] is empty. As long as the cell GT[R,V,D] is empty and the maximum depth K−1 is not reached (G=0 and D<K−1 during test 12), the variable D is incremented at step 13 in order to examine the next depth. If test 12 shows that G≠0, the ghost status G and the associated depth D are returned at step 14. If the ghost table contains no status for the cell T[R,W] (G=0 and D=K−1 during test 12), the empty status G=0 is returned at step 14.

In addition to the ghost table, managing the contents of the TRIE memory involves another table, what is referred to as the mirror table. The mirror table reflects the contents of the TRIE memory. It contains registers and corresponding cells. For each cell T[R,V] of the TRIE memory, the corresponding cell in the mirror table is written MT[R,V]. This cell MT[R,V] may contain:

a bit FP indicating by the value FP=1 that the cell T[R,V] contains a pointer and by the value FP=0 that the cell T[R,V] contains a status or is empty;

a bit FH locating the ghosted cells (FH=1) and non-ghosted cells (FH=0). A cell T[R,V] of a register of order i is referred to as <<ghosted>> if, for at least one whole depth D such that $0 \leq D < K$, a pattern of (i+1) K−D bits was inserted, the first iK bits of which form the sequence associated with the register and the last K−D bits of which correspond to the first K−D bits of the K bits forming the cell index V. In other words, the cell T[R,V] is ghosted if it belongs to one or more virtual cells for which the ghost table contains a ghost status. A ghosted cell may itself contain either a pointer or a length status at least equal to that of the ghost status of minimum depth;

if the cell T[R,V] contains a pointer (FP=1), the value Ptr of this pointer is contained in a field of the corresponding cell in the MT[R,V] in the mirror table;

if the cell T[R,V] contains a status (FP=0), the mask length λ of the pattern associated with this status is stored in a field of the corresponding cell MT[R,V] in the mirror table. By convention, the length λ=0 corresponds to an empty cell, the bits FP and FH of such a cell also being 0. For an empty cell T[R,V] of the TRIE memory, the corresponding cell MT[R,V] in the mirror table contains only 0 bits.

Figure 9:
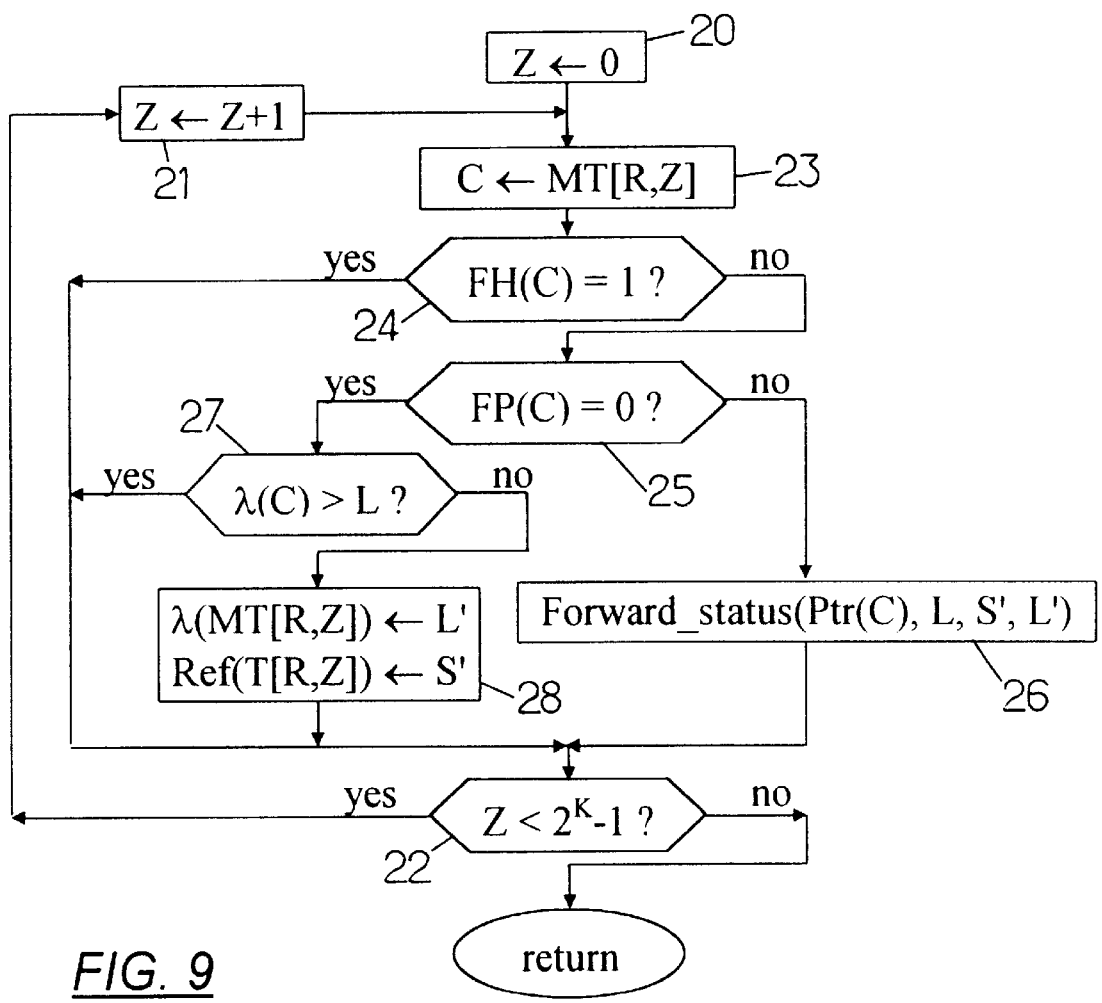
FIG. 9 is a flow chart illustrating a procedure run in order to propagate a reference in the memory.

FIG. 9 illustrates a recursive propagation procedure of a status S' associated with a pattern v' of a length L' starting from a register R of the TRIE memory, optionally taking account of the length $L \geq L'$ of a pattern V which may be identical to the pattern v or different. This procedure is written Forward_status(R, L, S', L').

If v'=v, the Forward_status(R, L, S', L') procedure manages the update of the implicit statuses in the situation where the status S' is being written on the paths of longer patterns already existing in the memory. In other words, if the latter are being transformed into the <<longest match>> of the pattern in question.

If v'≠v, the Forward_status(R, L, S', L') procedure manages the propagation of the implicit statuses when deleting a pattern whose status S' is overlapped by a pointer. The shadow V of length L may be the ghost of a status masked by S' but may also be empty. For example, the passage from FIG. 7B to FIG. 6B, which consists in deleting pattern 4 of mask 4 and of status 5, amounts to propagating the <<empty>> shadow in the place of P5 from the cell T[0,4], i.e. from register 1.

The Forward_status(R, L, S, L') procedure is recursive and incorporates an iteration for each slice of K bits located by the index Z ranging from 0 to $2^K-1$. Z is initialised to 0 at step 20 and incremented at step 21 if test 22 run at the end of the iteration indicates that $Z<2^K-1$. The procedure is terminated as far as the register R is concerned if $Z=2^K-1$ during test 22. For each slice Z, the contents of the cell MT[R,Z] of the mirror table corresponding to the cell T[R,Z] of the TRIE memory are read at step 23. If the cell T[R,Z] is not ghosted (FH(C)=0 at test 24), the bit FP(C) is examined in test 25 to determine whether the cell contains a pointer or not. If FH(C)=0 and FP(C)=1, the Forward_status(R, L, S', L') procedure is run starting from the register R' denoted by the pointer Ptr(C) contained in the cell (step 26). If the cell T[R,Z] is not ghosted and does not contain a pointer (FH(C)=FP(C)=0), a test is run at test 27 to ascertain whether it is empty ($\lambda(C)=0<L$) or whether it contains a status associated with a pattern of length $\lambda(C) \leq L$. If $\lambda(C) \leq L$ in test 27, the cell T[R,Z] of the TRIE memory and the corresponding cell in the mirror table are updated. During this update 28, the length L' is written to the field $\lambda$ of the cell MT[R,Z] of the mirror table and the status S' is written to the field Ref of the cell T[R,Z] of the TRIE memory.

Figure 10A:
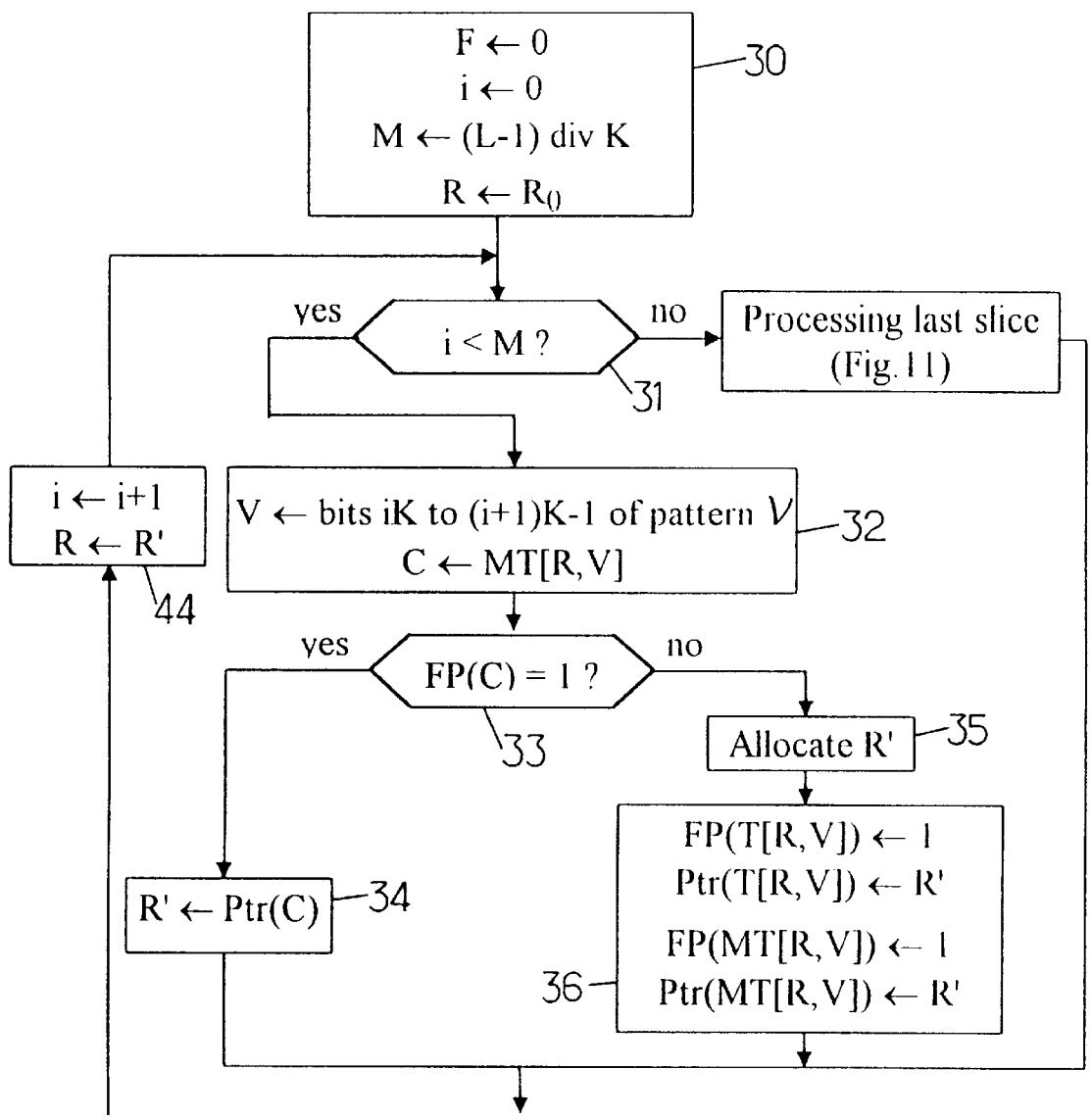
FIG. 10, which is formed by placing FIGS. 10A and 10B one on top of the other, is a flow chart showing a procedure run in response to a command to insert a pattern in the TRIE memory.
Figure 10B:
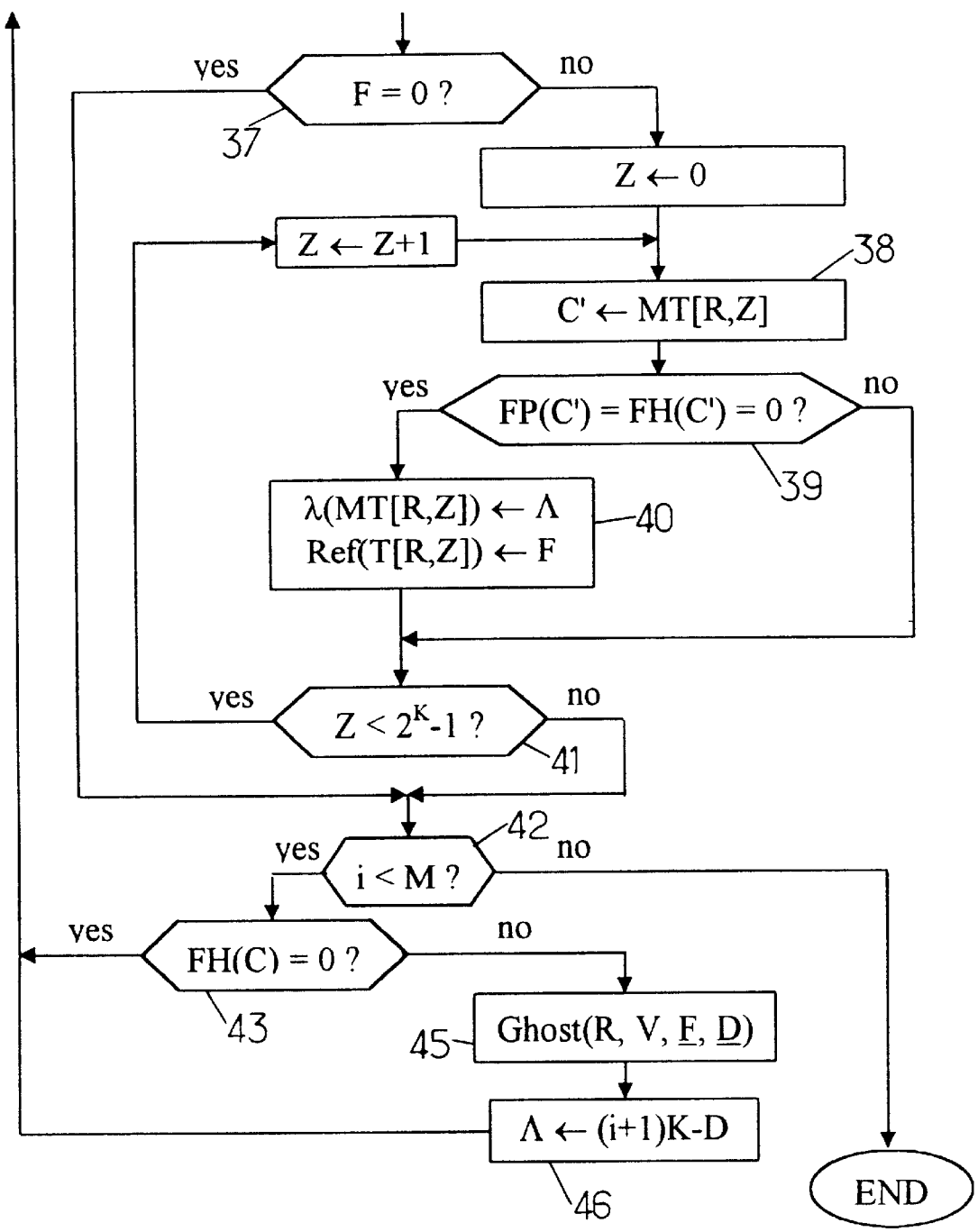

Moving on to FIGS. 10 and 11, a description will now be given of a procedure run in order to insert a pattern V in the TRIE memory, the mask of which is L=MK+B bits, associated with a status S. On initialisation 30, the rank i of the iteration is taken as 0, the portal register $R_0$ of order 0 is selected as the register R and an empty status (0) is assigned to the active status F. Furthermore, the number M of slices to be processed before the last slice of the pattern to be inserted is calculated by a Euclidian division of L−1 by K. If i=M during test 31, the procedure moves on to the operations relating to insertion of the last slice, which will be described below with reference to FIG. 11. If not ($0 \leq i<M$), the steps illustrated in FIG. 10 are run to process the (i+1)-th slice of the pattern v.

At step 32, the K-bit variable V receives the (i+1)-th slice of the pattern v and the contents of the cell MT[R,V] in the mirror table of co-ordinates R,V, are read, R denoting the register of order i previously selected. If this cell contains a pointer (FP(C)=1 in test 33), this pointer Ptr(C) is assigned to the variable R' at step 34 in order to select the register of order i+1 which it designates for the next iteration of rank i+1. If test 33 shows that FP(C)=0, the cell does not contain a pointer to another register and a register R' is allocated at step 35 by selection from a list of registers available in the TRIE memory. A register is deemed to be available if each of its cells contains no pointer and is not ghosted. At step 36, the cell of co-ordinates R,V is updated in the TRIE memory and in the mirror table. This update consists in setting the bit FP to 1 and writing the pointer R' of the allocated register to the field Ptr of the cell.

Figure 11:
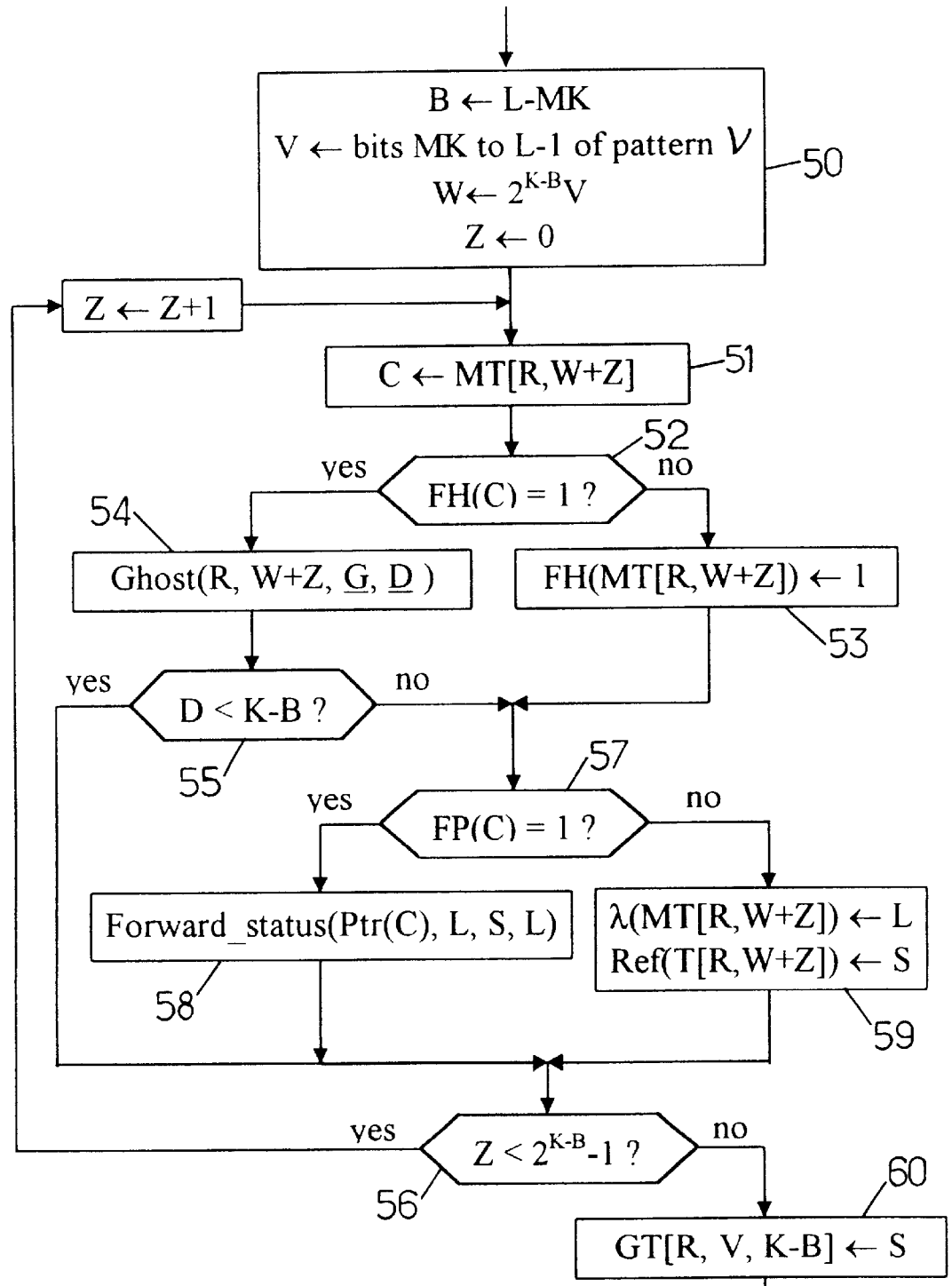
FIG. 11 is a flow chart showing a part of the procedure of FIG. 10, relating to the last slice of the pattern inserted.

After step 34 or 36, and after the processing performed in FIG. 11 if i=M, a test will be run to see if an active status, of value F, was overlapped by a pointer on the path taken (test 37). If there is such an active status (F≠0 in test 37), this status is inscribed by default in each cell of the register R which is not ghosted and does not contain a pointer. For each slice Z of K bits denoting a cell of the register R, the contents of the cell of co-ordinates R,Z in the mirror table are read at step 38, and if the contents show that the corresponding cell in the TRIE memory is not ghosted and does not contain a pointer (FP(C')=FH(C')=0 at test 39), the cells of co-ordinates R,Z in the TRIE memory and the mirror table are updated. This update 40 consists in writing the active status F to the field Ref of the cell T[R,Z] and the length $\Lambda$ of this status F to the field $\lambda$ of the cell MT[R,Z].

In the absence of an active status (F=0 in test 37), or once writing of the active status in the register R has been completed ($Z=2^K-1$ in test 41), the insertion procedure is terminated if i=M in test 42.

If i<M, a test is run to ascertain whether the cell of the register of order i through which the path of the inserted pattern passed is a ghosted cell (test 43). If this cell is not ghosted (FH(C)=0), there is no need to consider its possible ghost statuses and the iteration of rank i is terminated at step 44 by incrementing the rank i and taking R=R' as the selected register of order i+1 for the next iteration.

If the cell is ghosted (FH(C)=1) in test 43), the function Ghost(R, V, <u>FD</u>) is called at step 45 to obtain the active status F which corresponds to the pattern which, before inserting the pattern v, fulfilled the condition of <<longest match>> for the cell of co-ordinates R,V. At step 46, the length $\Lambda$ of this active status F is calculated with the aid of the depth D returned by the Ghost function: $\Lambda=(i+1)K-D$. After step 46, the iteration of rank i is terminated by step 44 mentioned above.

The iteration of rank i=M of the procedure for inserting the pattern V starts with step 50 of FIG. 11 in which:
- the number B of bits of the last slice (B=L−MK) is determined;
- the variable of B bits V receives the last B bits of the pattern v;
- the variable of K bits W is taken as being equal to $2^{K-B}V$;
- the index Z is initialised to 0.

The virtual cell to which the pattern V leads is examined in order to proceed with the requisite updates, each cell of the mirror table belonging to the register R and indexed by W+Z being examined to ascertain whether $0 \leq Z<2^{K-B}-1$. The contents of this cell in the mirror table are read at step 51.

If the corresponding cell in the TRIE table is not ghosted (FH(C)=0) in test 52), the value of this bit FH in the cell of the mirror table of co-ordinates R,W+Z will have to be amended (step 53) since the status S will be written to the corresponding cell in the ghost table of depth K−B. If the cell T[R,W+Z] was already ghosted (FH(C)=1 in test 52), the Ghost function is called at step 54 to obtain the minimum depth D of the associated ghost status G. If this depth D is less than that of K−B corresponding to the inserted status S (test 55), the inserted status S is assigned by a <<longest match>> relative to the cell examined T[R,W+Z], so that the operations relating to this cell are terminated, i.e. the procedure immediately moves on to the end-of-loop test 56. At step 57, which follows steps 53, or test 55 if D≧K−B, the value of the bit FP relative to the cell being examined T[R,W+Z] is tested to ascertain whether it contains a pointer. If such is the case, the Forward_status(Ptr(C), L, S, L) procedure is run to propagate the status S starting from the register designated by the pointer Ptr(C) contained in this cell, in accordance with the flow chart of FIG. 9 (step 58). If not (FP(C)=0), the current cell is simply updated at step 59 by writing the length L in the field $\lambda$ of the cell MT[R,W+Z] in the mirror table and the status S in the field Ref of the corresponding cell in the TRIE table.

Once all the elementary cells of the virtual cell of index V have been examined ($Z=2^{K-B}$ in test 56), the inserted pattern S is written in the cell GT[R,V,K−B] of the ghost table at step 60. The procedure then moves on to step 37 of FIG. 10B to examine whether it is necessary to update the free cells in the register of order M. The insertion procedure will terminate after test 42 (i=M).

Figure 12A:
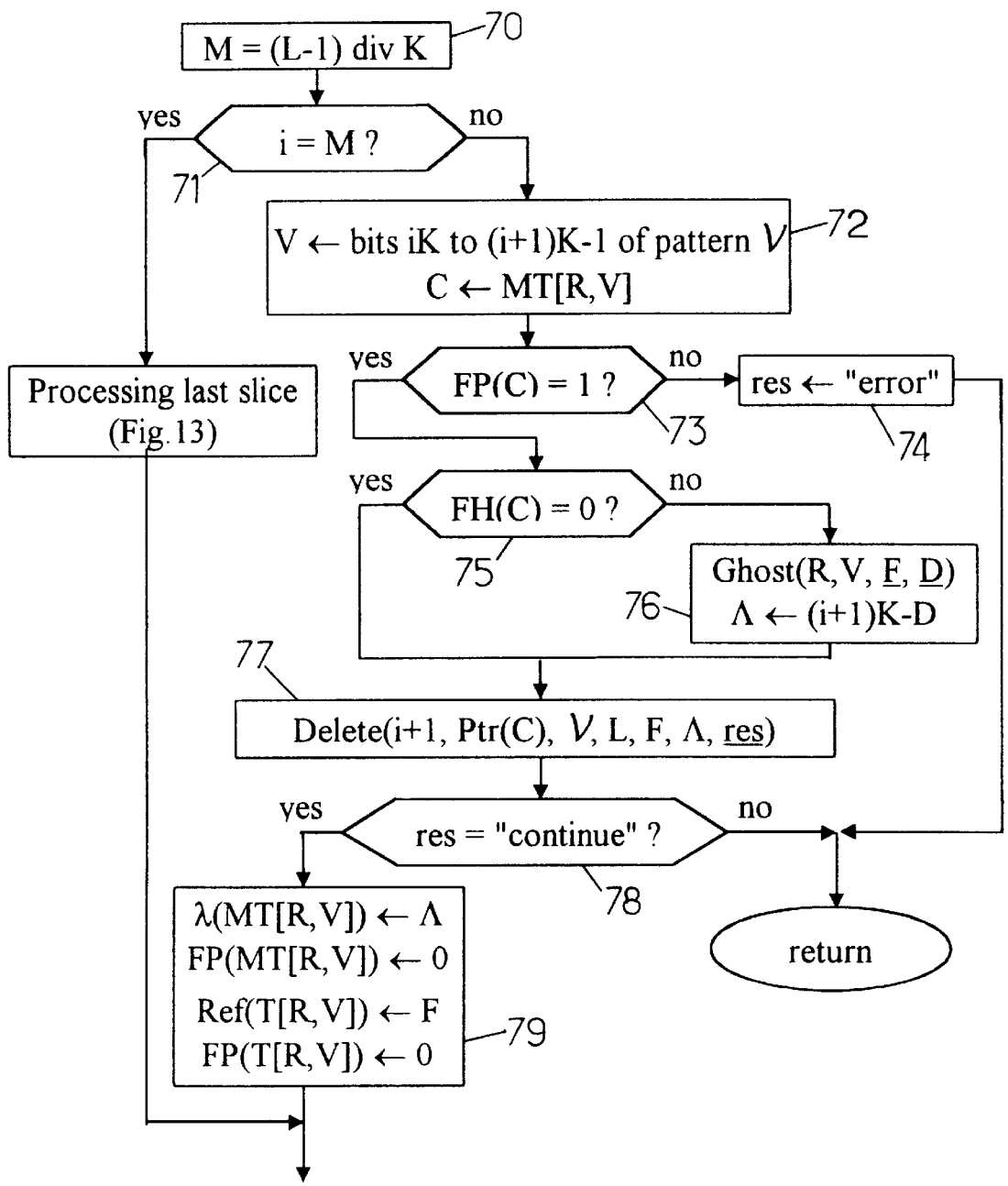
FIG. 12, which is formed by placing FIGS. 12A and 12B one on top of the other, is a flow chart showing a procedure run in response to a command to delete a pattern from the TRIE memory.

The procedure usable to delete a pattern v of L=MK+B bits from the TRIE memory may be in the form of a function Delete(i, R, v, L, F, Λ, <u>res</u>) called recursively. On initialisation, the function is called at rank i=0 with an empty active status (F=0, Λ=0). The flow chart for this function, as called for rank i≧0 is illustrated in FIGS. 12 and 13.

At the start (step 70), a calculation is performed by a Euclidian division of L−1 by the length K of a slice in order to determine the number M of slices of the pattern v to be examined before the last slice. If the rank i calling the function is equal to M (test 71), the last slice is processed in the manner described below with reference to FIG. 13.

If not (i<M), the K-bit variable V receives the (i+1)-th slice of K bits of the pattern v and the contents of the cell in the mirror table of co-ordinates R, V are read (step 72). If the corresponding cell in the TRIE memory does not contain a pointer (test 73), it is because the pattern for which deletion has been requested is not contained in the TRIE memory. This being the case, the function returns at rank i a result res indicating an error (step 74) and the delete procedure is terminated. If the cell does contain a pointer, a test is run to ascertain whether it is ghosted in test 75. If the cell is ghosted (FH(C)=1), it is necessary to retrieve as the active status F the ghost status of the smallest depth associated with the cell. This is done at step 76 by calling the function Ghost(R, V, <u>F</u>, <u>D</u>) as described with reference to FIG. 8. The length Λ of this active status F is also calculated: Λ=(i+1) K−D.

The Delete function is then called at rank i+1 for which the register of order i+1, designated by the pointer Ptr(C) read at rank i in the mirror table, is selected. The function is called up at step 77 with the arguments Delete(i+1, Ptr(C), v, L, F, Λ, <u>res</u>). If the result returned res does not indicate that the procedure must continue (test 78), running of the function at rank i is terminated.

If the function called at rank i+1 returns the result <<continue>>, the procedure continues to rank i by updating the cell of co-ordinates R, V in the TRIE table and in the mirror table. This update 79 consists in setting the bit FP to 0 and writing the active status F to the field Ref of the cell T[R,V] and its length Λ to the field λ of the cell MT[R,V]. If there is no active status, i.e. if F=0 and Λ=0 (which means that the cell is not ghosted: FH=0), the update 79 amounts to setting everything to zero in the cell of co-ordinates R,V.

Figure 12B:
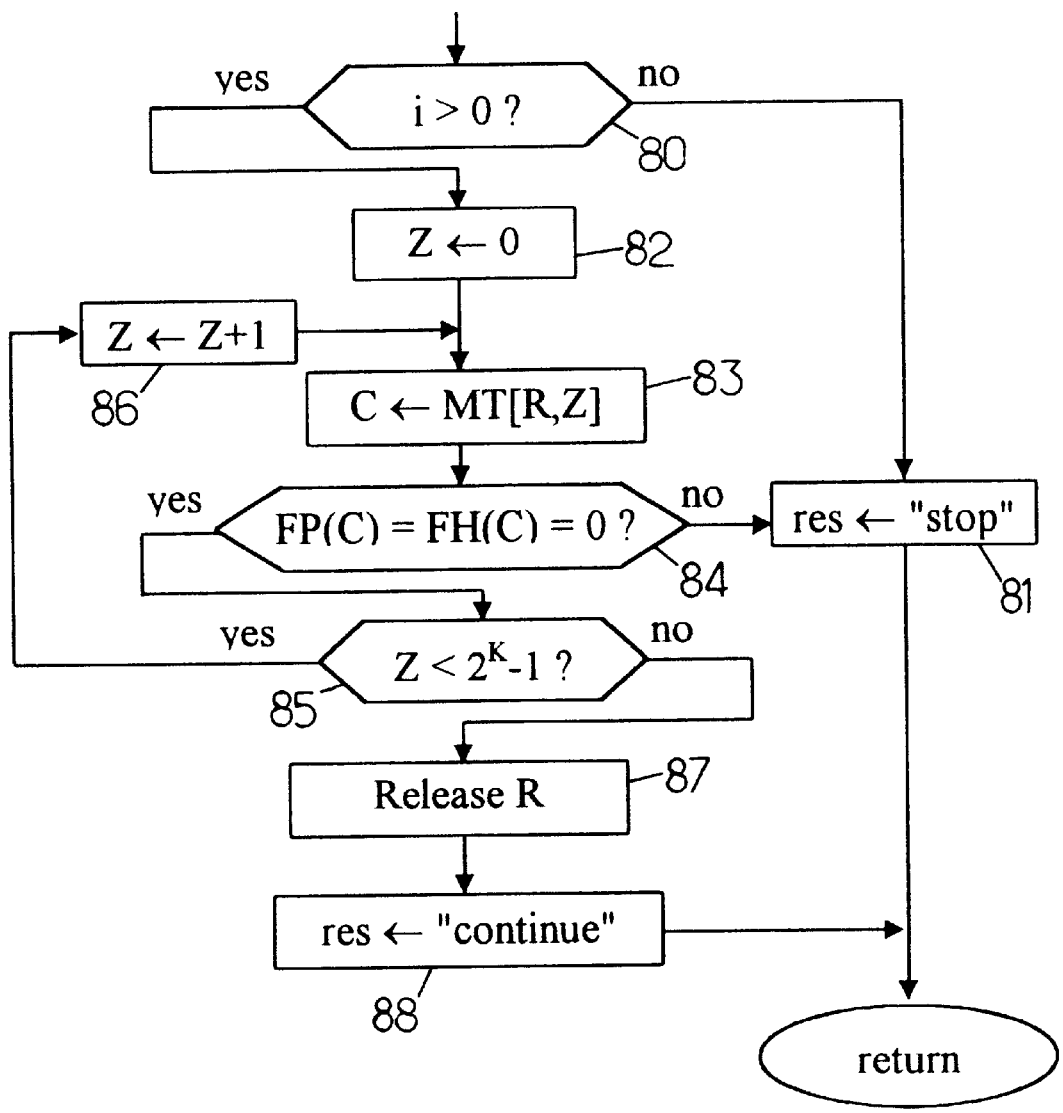
Figure 13:
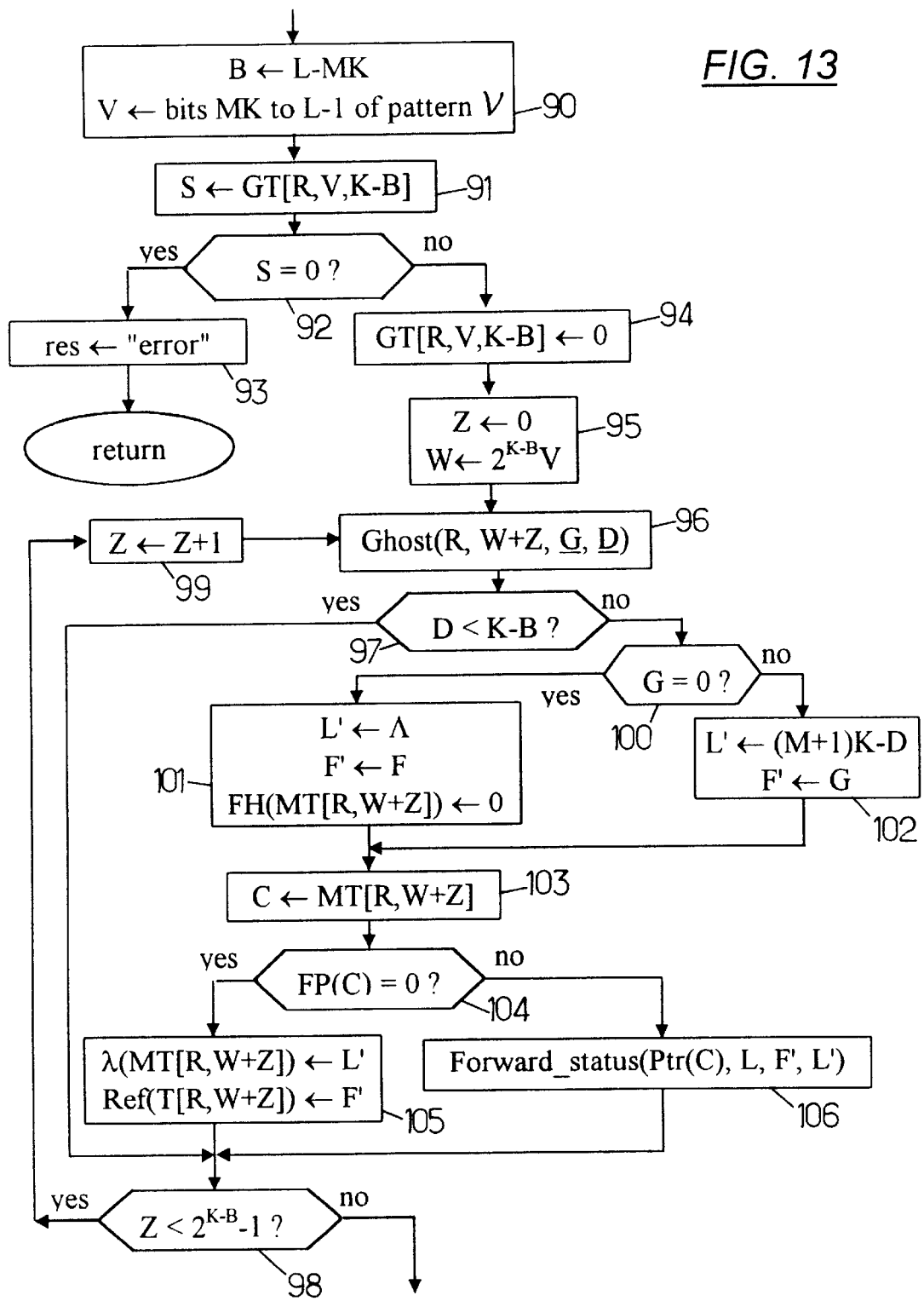
FIG. 13 is a flow chart showing a part of the procedure illustrated in FIG. 12, relating to the last slice of the pattern inserted.

The operations represented in FIG. 12B are performed after the update 79 if i<M and after the processing illustrated in FIG. 13 if i=M.

If i=0 (test 80) or if the register R of order i contains at least one pointer or at least one ghosted cell, then the function at rank i is terminated at step 81, returning res as a result, indicating a stop. In order to verify whether the register R of order i contains at least one pointer or at least one ghosted cell, a loop is run on the Z slices of K bits, initialised by Z=0 at step 82. In each iteration of this loop, the contents of the cell MT[R,Z] are read from the mirror table at step 83 and the bits FP and FH of this cell examined at step 84. The result res=<<stop>> is returned if FP(C)=1 or FH(C)=1. If not, the index of slice Z is compared with $2^K-1$ in test 85 and incremented at step 86 if Z<$2^K-1$. If Z=$2^K-1$, all the cells of register R have been released, i.e. they no longer contain a pointer and are no longer ghosted. The register R may therefore be restored at step 87 to the list of available registers which can be allocated in the insertion procedures (step 35 of FIG. 10A). The function run for rank i is then terminated at step 88, returning the result <<continue>>.

With reference to FIG. 13, the processing performed for the last slice of the deleted pattern v (run if i=M in test 71) starts at step 90 by calculating the length B=L−MK of this last slice and by loading the last B bits of the pattern v into the B-bit variable V. The status S contained in the ghost cell GT[R,V,K−B] is read at step 91. If this status S has the value 0 (test 92), it is because the deletion of a pattern with which no status was associated has been requested so that the delete procedure ends at rank M returning a result res, indicating an error (step 93).

The status S is deleted at step 94 by writing the value 0 to the cell GT[R,V,K−B) of the ghost table. The virtual cell is then updated in a loop on the different slices of K−B bits which complete the slice V of B bits. This loop is initialised at step 95 by the values Z=0 and W=$2^{K-B}$V. In each iteration of this loop, the function Ghost(R, W+Z, <u>G</u>, <u>D</u>) described with reference to FIG. 8 is called at step 96. If the Ghost procedure returned a ghost status G for depth D smaller than K−B (test 97), deletion of the status S will have no effect on the contents of the cell T[R,W+Z]. The iteration Z ends at test 98 where Z is compared with $2^{K-B}-1$. Provided that Z<$2^{K-B}-1$, the index Z is incremented at step 99 before repeating step 96. If test 97 shows that the depth D returned by the Ghost procedure is at least equal to K−B, a check is made at step 100 to ascertain whether the ghost status G returned by the Ghost procedure has the value 0 (no ghost status) or not. If it has the value 0, deletion will cause the cell T[R,W+Z] to be no longer ghosted so that the bit FH of this cell is set to 0 in the mirror table at step 101. Furthermore, the status F', active for the remainder of the procedure, receives the status F included in the arguments calling the Delete function at rank M (the most recent active status F obtained at step 76 or F=0) and the variable L' receives the length Λ of this status F.

If the cell T[R,W+Z] of a length at least equal to that of the deleted status S (G≠0 at test 100) still has a ghost status, this ghost status G becomes the active status: it is assigned to the status F' at step 102 and its length (M+1)K−D is assigned to the variable L'.

At step 103, the contents of the cell MT[R,W+Z] of the mirror table are read. If this cell does not contain a pointer (FP(C)=0 in test 104), the cell of co-ordinates R,W+Z are simply updated by writing the active status F' to the Ref field of the TRIE table and its length L' to the field λ of the mirror table (step 105). If the cell contains a pointer (FP(C)=1 at test 104), the active status F' of length L' is propagated at step 106 starting from the register of order M+1 denoted by the pointer Ptr(C) obtained in the cell MT[R,W+Z], taking account of the length L of the deleted status. This is run by calling the recursive procedure Forward_status(Ptr(C), L, F', L') described with reference to FIG. 9.

Figure 14:
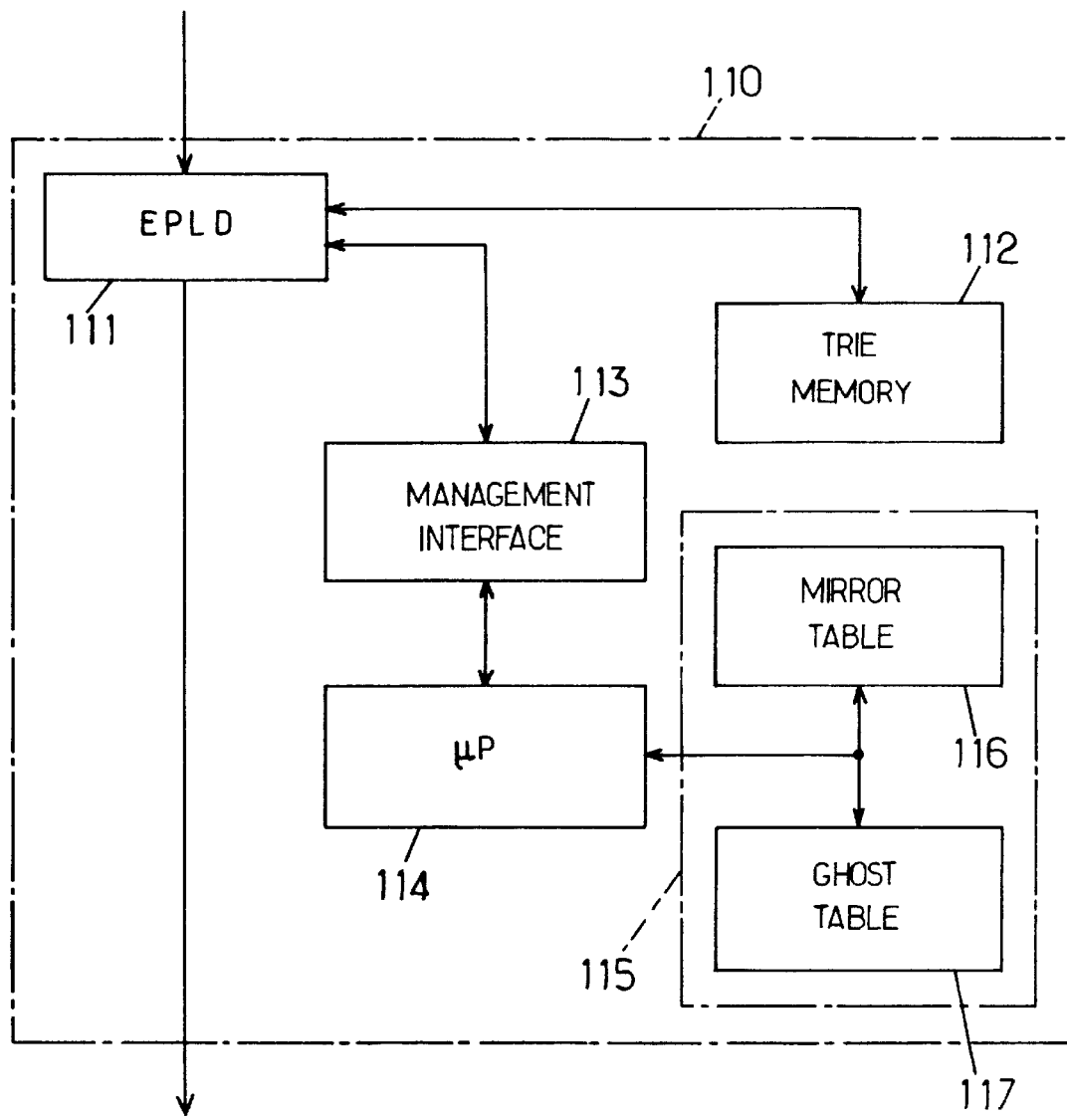
FIG. 14 is a block diagram of a router according to the invention.

FIG. 14 illustrates an operating diagram of an example of a router 110 implementing the present invention. An analysis circuit 111, which may be a programmable array of the EPLD type, controls accesses to the TRIE memory 112. The circuit 111 applies the analysis algorithm illustrated in FIG. 2 to strings of N bits incorporated in the headers of packets received at the input of the router 110. These packets may consist of ATM (Asynchronous Transfer Mode) cells in particular. As mentioned above, the router 110 may be a multi-protocol router and analyse different strings of the packet headers from different portal registers of the TRIE memory 112. The circuit 111 is programmed to trigger the requisite operations depending on the result of the analysis. In particular, it directs the packet to one or the other of a set of destination ports depending on an analysis of the destination address contained in the header.

One of these destination ports is an interface 113 for managing the router. This interface 113 has registers to which the analysis circuit 111 transfers packets containing the information pertaining to the router itself and in particular instructions to insert or delete patterns from the routing table. It should be pointed out that the interface 113 is one of several means of transferring packets and that the information pertaining to the router is not necessarily in the form of packets.

The router 110 also has a processor 114, loaded in order to run the procedures of FIGS. 8 to 13 relating to the updates of the TRIE table. Unlike the analysis of the packets by the circuit 111, these updates are not necessarily applied in real time. In the memory area 115 accessed by the processor 114, a zone 116 is provided in order to contain the mirror table and a zone 117 to contain the ghost table.

If running the update procedures requires data to be written to the TRIE memory 112 (steps 28, 36, 40, 59, 79 and 105 of FIGS. 9 to 13), the processor 114 writes corresponding commands to the registers of the management interface 113. These registers can be read by the circuit 111 whilst it is not processing a packet so that the contents of the TRIE memory 112 are amended as required. The contents of the mirror table 116 and the ghost table 117 are not in effect amended by the processor 114 until the end of the procedure of inserting or deleting a pattern leading to such an amendment.

Data may be represented in different ways in the memories 112, 116 and 117. In the TRIE memory 112 which the circuit 111 accesses in real time, it may be that there is no formal difference in the way a pointer and a status is represented even though these two concepts are different in the logic of the analysis algorithm. The bit FP is not necessarily explicitly present in the cells of memory 112. In this memory, a status may have the same form as a pointer, which would denote another portal register of the memory whilst triggering a time delay or alternatively a jump of a given number of bits in the analysed string. This does not prevent the analysis algorithm of FIG. 2 from being run on the logical level.

The mirror table 116 is a functional image of the TRIE memory 112, forming a matrix of same dimensions. This table 116 makes it possible to overcome the constraints of representation which are needed to operate the circuit 111. It enables the processor 114 to follow the paths, characterise, inscribe or propagate the end-of-pattern statuses without having to take account of the structure of the corresponding data in the cells of the TRIE memory 112. The cells of the mirror table 116 contain a simplified image of those of the TRIE memory 112. As can be seen, it is not necessary to incorporate the statuses in the mirror table 116 but only the length of the associated patterns. It is sufficient for the statuses to be recorded in the ghost table 117.

The ghost table 117 stores the statuses associated with the inserted binary patterns, each status being stored at a location of the ghost table 117 corresponding to the cell in the TRIE memory 112 where it would be stored if the associated pattern were the only pattern inserted.

In the ghost table 117, the statuses may be saved in a form close to that provided by the user, the processor 114 taking over the requisite translations. The addressing structure in the ghost table 117 may vary dynamically depending on the registers of the TRIE memory which require ghost registers (for example, only register 2 needs ghost registers in the situation illustrated in FIG. 3B), it would also be possible to adopt other ways of organising the ghost table. For example, the ghosted/non-ghosted bit FH of each cell in the mirror table could be replaced by K bits each indicating whether there is a ghost status for the depth D ($0 \leq D < K$) in question. In such a case, allocation of the memory resources of the ghost table 117 is managed at the level of the cells and not at the level of the registers.

What is claimed is:

1. A method of updating a TRIE-type associative memory organised as a set of registers of $2^K$ cells including at least one portal register from which bit strings are analysed in successive slices of K bits, K being an integer at least equal to 1, each non-empty cell of the TRIE memory containing data incorporating either a continue analysis pointer or a reference, the TRIE memory associating an integer order $i \geq 0$ and a respective sequence of iK bits with each register, the analysis of a bit string consisting of at least one iteration of rank i, starting from the rank i=0 for which the portal register of order 0 is selected, whereby the iteration of rank i comprises the steps of:

reading data in a cell of the register of order i selected, denoted by the (i+1)-th slice of K bits in the string analysed;

if the data read contains a continue analysis pointer, selecting a register of order i+1 of the TRIE memory as indicated by said pointer, the sequence associated with the register of order i+1 selected being formed by the first (i+1)K bits of the string analysed, then running the iteration of rank i+1;

if the data read represents end analysis data and contains no continue analysis pointer, terminating the analysis by issuing a reference contained in said end analysis data, wherein the data are stored in the cells of the TRIE memory in response to commands to insert and delete binary patterns of variable length each associated with a reference, so that when a bit string is being analysed, the reference issued will be that associated with the longest of the binary patterns matching the start of the string analysed.

2. A method as claimed in claim 1, wherein a mirror table is used, made up of registers of $2^K$ cells, wherein each register of the mirror table corresponds to a respective register of the TRIE memory allocated to the portal register, wherein each of the $2^K$ cells of a register in the mirror table corresponds to a respective cell in the corresponding register of the TRIE memory, and wherein each cell in the mirror table corresponding to a non-empty cell of the TRIE memory contains at least:

information indicating whether said corresponding non-empty cell of the TRIE memory contains a continue analysis pointer;

if said corresponding non-empty cell of the TRIE memory contains a continue analysis pointer, the continue analysis pointer in question;

if said corresponding non-empty cell of the TRIE memory does not contain a continue analysis pointer but a reference, the length of a binary pattern associated with said reference.

3. A method as claimed in claim 2, wherein each cell of the mirror table corresponding to a non-empty cell of a register of order $i \geq 0$ of the TRIE memory further contains:

information indicating whether said corresponding non-empty cell of the TRIE memory is ghosted, i.e. whether, for at least one integer depth D such that $0 \leq D < K$, a pattern of $(i+1)K-D$ bits has been inserted, the first $iK$ bits of which form the sequence associated with said register of order $i$ and the last $K-D$ bits of which correspond to the first $K-D$ of the $K$ bits denoting said corresponding cell of the TRIE memory within said register of order $i$.

4. A method as claimed in claim 3, wherein a ghost table is used which stores the references associated with the binary patterns inserted and wherein, for each ghosted cell of a register of order $i \geq 0$ of the TRIE memory, the ghost table stores each reference associated with an inserted pattern of $(i+1)K-D$ bits, such that $0 \leq D < K$, the first $iK$ bits of which form the sequence associated with said register of order $i$ and the last $K-D$ bits of which correspond to the first $K-D$ of the $K$ bits denoting said ghosted cell of the TRIE memory within said register of order $i$.

5. A method as claimed in claim 4, comprising the step of looking up the ghost table to obtain, relative to a ghosted cell of a register of order $i$ of the TRIE memory, the reference associated with the inserted pattern of $(i+1)K-D$ bits having a minimum depth D, the first $iK$ bits of which form the sequence associated with said register of order $i$ and the last $K-D$ bits of which correspond to the first $K-D$ bits of the $K$ bits denoting said cell in the TRIE memory within said register of order $i$.

6. A method as claimed in claims 5, wherein the ghost table has, for each register of order $i$ of the TRIE memory having at least one ghosted cell and for each depth D such that $0 \leq D < K$, $2^{K-D}$ memory locations containing respectively, as applicable, the references associated with the inserted patterns of $(i+1)K-D$ bits, the first $iK$ bits of which form the sequence associated with said register of order $i$, and wherein obtaining a reference relating to a ghosted cell of a register or order $i$ of the TRIE memory incorporates the following step, run for the depths D increasing from D=0 until a reference is returned:

if one of the $2^{K-D}$ memory locations contained in the ghost table for said register of order $i$ contains a reference associated with an inserted pattern of $(i+1)K-D$ bits, the first $iK$ bits of which form the sequence associated with said register of order $i$ and the last $K-D$ bits of which correspond to the first $K-D$ bits of the $K$ bits denoting said ghosted cell of the TRIE memory within said register of order $i$, returning said reference and the depth D.

7. A method as claimed in claim 4, wherein the ghost table has, for each register of order $i$ of the TRIE memory having at least one ghosted cell and for each depth D such that $0 \leq D < K$, $2^{K-D}$ memory locations containing respectively, as applicable, the references associated with the inserted patterns of $(i+1)K-D$ bits, the first $iK$ bits of which form the sequence associated with said register of order $i$.

8. A method as claimed in claim 4, wherein the following operations are run in response to a command to insert a first pattern of $L=MK+B$ bits associated with a first reference, M and B being integers such that $M \geq 0$ and $1 \leq B \leq K$:

selecting the portal register of order 0;

if $M>0$, proceeding with the following steps /a/ to /e/ for each of the values of the rank $i$ increasing from 0 to M−1:

/a/ reading the data in a first cell of the mirror table corresponding to the cell of the TRIE memory indicated by the $(i+1)$-th slice of $K$ bits of the first pattern within the register of order $i$ selected;

/b/ if the data read in the first cell indicates that said corresponding cell of the TRIE memory contains a continue analysis pointer, selecting the register of the TRIE memory designated by said pointer as the register of order $i+1$;

/c/ if the data read in the first cell indicates that said corresponding cell of the TRIE memory does not contain a continue analysis pointer, selecting a register available in the TRIE memory as a register of order $i+1$, writing in said corresponding cell of the TRIE memory a continue analysis pointer designating the selected register of order $i+1$ and writing in the first cell of the mirror table an indication that said corresponding cell of the TRIE memory contains a continue analysis pointer as well as said pointer;

/d/ if a second reference, associated with a second binary pattern, was previously obtained, writing said second reference in each non-ghosted cell of the TRIE memory belonging to the register of order $i$ selected and not containing a pointer and write the length of said second binary pattern in each corresponding cell of the mirror table;

/e/ if the data read in the first cell indicates that said corresponding cell of the TRIE memory is ghosted, obtaining from the ghost table a second reference associated with a second binary pattern constituted by the inserted pattern of $(i+1)K-D$ bits having a minimum depth D, the first $iK$ bits of which form the sequence associated with the register of order $i$ selected and the last $K-D$ bits of which correspond to the first $K-D$ bits of the $K$ bits denoting said ghosted cell within the register of order $i$ selected;

proceeding with the following steps /f/ to /j/ for each slice of K bits of the form $2^{K-B}V_M+Z$ where $V_M$ is the number formed by the last B bits of the first pattern and Z is an integer ranging between 0 and $2^{K-B}-1$:

/f/ reading data in a second cell of the mirror table corresponding to the cell of the TRIE memory denoted by said slice $2^{K-B}V_M+Z$ within the register of order M selected;

/g/ if the data read in the second cell indicates that the corresponding cell of the TRIE memory is ghosted, obtaining from the ghost table the length of the inserted pattern of $(M+1)K-D$ bits having a minimum depth D, the first $MK$ bits of which form the sequence associated with the register of order M selected and the last $K-D$ bits of which correspond to the first $K-D$ bits of the $K$ bits designating said ghosted cell within the register of order M selected and do not run steps /h/ to /j/ if the depth obtained is less than K−B;

/h/ if the data read in the second cell indicates that the corresponding cell of the TRIE memory is not ghosted, writing in the second cell of the mirror table an indication that the corresponding cell of the TRIE memory is ghosted;

/i/ if the data read in the second cell indicates that the corresponding cell of the TRIE memory contains a continue analysis pointer, recursively propagating the first reference associated with the first binary pattern starting from the register designated by said continue analysis pointer;

/j/ if the data read in the second cell indicates that the corresponding cell of the TRIE memory does not contain a continue analysis pointer, writing said first reference in said corresponding cell of the TRIE memory and write the length of said first binary pattern in the second cell of the mirror table;

writing in the ghost table the first reference, in relation with the depth K−B for each cell of the TRIE memory designated by a slice of K bits of the form $2^{K-B}V_M+Z$, where Z is an integer ranging between 0 and $2^{K-B}-1$; and running step /d/ for the rank i=M.

9. A method as claimed in claim 8, wherein the recursive propagation of a first reference associated with a first binary pattern starting from a given register of the TRIE memory includes the following steps for each slice of K bits:

reading data in the cell of the mirror table corresponding to the cell of the TRIE memory designated by said slice of K bits within said register;

if the data read indicates that the cell of the TRIE memory designated by said slice of K bits within said register is not ghosted, does not contain a continue analysis pointer and does not contain a reference associated with a binary pattern longer than the first binary pattern, writing said first reference in the cell of the TRIE memory designated by said slice of K bits within said register and writing the length of said first binary pattern to the corresponding cell of the mirror table;

if the data read in the third cell indicates that the cell of the TRIE memory designated by said slice of K bits within said register is not ghosted and contains a continue analysis pointer, recursively propagating the first reference (S') associated with the first binary pattern starting from the register designated by said continue analysis pointer (Ptr(C)).

10. A method as claimed in claim 4, wherein, in response to a command to delete a first pattern of L=MK+B bits associated with a first reference, where M and B are integers such that $M \geq 0$ and $1 \leq B \leq K$, a recursive procedure is run, starting from rank i=0 for which the portal register of order 0 is selected, whereby said recursive procedure comprises nested iterations for the ranks $i \geq 0$ and each iteration of rank $i \geq 0$ comprises the operations of:

if i<M, proceeding with the following steps /a'/ to /h'/:

/a'/ selecting for the rank i a first cell of the mirror table corresponding to the cell of the TRIE memory denoted by the (i+1)-th slice of K bits of the first pattern within the register of order i selected and reading data in the first cell selected for rank i;

/b'/ if the data read in the first cell selected for rank i indicates that the corresponding cell of the TRIE memory is ghosted, obtaining from the ghost table a second reference associated with a second binary pattern constituted by the inserted pattern of (i+1) K–D bits having a minimum depth D, the first iK bits of which form the sequence associated with the register of order i selected and the last K–D bits of which correspond to the first K–D bits of the K bits denoting said ghosted cell within the register of order i selected;

/c'/ selecting as a register of order i+1 a register of the TRIE memory designated by a continue analysis pointer included in the data read;

/d'/ performing the iteration of rank i+1;

/e'/ writing in the first cell of the mirror table selected for the rank i an indication that the corresponding cell of the TRIE memory does not contain a continue analysis pointer;

/f/ if a second reference associated with a second binary pattern was previously obtained, writing said second reference in the cell of the TRIE memory corresponding to the first cell selected for rank i and write the length of said second binary pattern in the first cell selected for rank i;

/g'/ if no second reference was previously obtained, writing in the first cell selected for rank i an indication that the corresponding cell of the TRIE memory is empty;

/h'/ if i>0 and each cell of the register of the mirror table corresponding to the register of order i selected indicates that the corresponding cell of the TRIE memory does not contain a continue analysis pointer and is not ghosted, making the register of order i selected available;

if i=M, deleting the reference associated with the first binary pattern of the ghost memory for the cell of the TRIE memory denoted by the slice of K bits $2^{K-B}V_M$ from the register of order M selected for the rank M where $V_M$ is the number formed by the last B bits of the first pattern and proceed with the following steps /i'/ to /l'/ for each cell of the TRIE memory designated by a slice of K bits of the form $2^{K-B}V_M+Z$, where Z is an integer ranging between 0 and $2^{K-B}-1$:

/i'/ looking up the ghost table to determine whether it contains, for said cell denoted by the slice $2^{K-B}V_M+Z$, at least one reference associated with a third binary pattern of a depth at least equal to K–B and, as applicable, selecting the third binary pattern of minimum depth;

/j'/ if the ghost table does not contain a reference for said cell denoted by the slice $2^{K-B}V_M+Z$, writing in the corresponding cell of the mirror table an indication that said cell denoted by the slice $2^{K-B}V_M+Z$ is not ghosted and, if a second reference associated with a second binary pattern was previously obtained, selecting said second binary pattern as the third binary pattern;

/k'/ if a third binary pattern has been selected and if said cell designated by the slice $2^{K-B}V_M+Z$ contains a continue analysis pointer according to the data read in the corresponding cell of the mirror memory, recursively propagating a third reference associated with the selected third binary pattern starting from the register designated by said continue analysis pointer, taking account of the length of the first binary pattern;

/l'/ if a third binary pattern has been selected and if said cell designated by the slice $2^{K-B}V_M+Z$ does not contain a continue analysis pointer according to the data read in the corresponding cell of the mirror memory, writing in the cell of the TRIE memory denoted by said slice $2^{K-B}V_M+Z$ a third reference associated with the third binary pattern selected and writing the length of the selected third binary pattern in the corresponding cell of the mirror table.

11. A method as claimed in claim 10, wherein the recursive propagation of a third reference associated with a third binary pattern starting from a given register of the TRIE memory, taking account of the length of the first binary pattern, comprises the following steps for each slice of K bits:

reading the data in the cell of the mirror table corresponding to the cell of the TRIE memory designated by said slice of K bits within said register;

if the data read indicates that the cell of the TRIE memory designated by said slice of K bits within said register is not ghosted, does not contain a continue analysis pointer and does not contain a reference associated with a binary pattern longer than the first binary pattern, writing said third reference in the cell of the TRIE memory designated by said slice of K bits within said register and writing the length of said third binary pattern in the corresponding cell of the mirror table;

if the data read indicates that the cell of the TRIE memory designated by said slice of K bits within said register is not ghosted and contains a continue analysis pointer, recursively propagating the third reference associated with the third binary pattern starting from the register designated by said continue analysis pointer, taking account of the length of the first binary pattern.

12. A method as claimed in claim 10, wherein, for each rank i<M, if the data read in step /a'/ indicates that the cell of the TRIE memory corresponding to the first cell selected for rank i does not contain a continue analysis pointer, the recursive process is terminated by indicating an error.

13. A method as claimed in claim 10, wherein, before deleting the reference associated with the first binary pattern from the ghost memory for the cell of the TRIE memory designated by the slice of K bits $2^{K-B}V_M$ from the register of order M selected for rank M, the contents of the ghost table in respect of said cell are read at depth K–B and if said contents do not correspond to a reference or correspond to a different reference from that associated with the first binary pattern, the recursive process is terminated by indicating an error.

14. A packet processing device comprising circuitry for analysing the header of packets received with the aid of a TRIE-type associative memory and means for updating the TRIE memory, wherein the TRIE memory is organised as a set of registers of $2^K$ cells including at least one portal register from which bit strings are analysed by said circuitry in successive slices of K bits, K being an integer at least equal to 1, each non-empty cell of the TRIE memory containing data incorporating either a continue analysis pointer or a reference, the TRIE memory associating an integer order $i \geq 0$ and a respective sequence of iK bits with each register, wherein the analysis of a bit string by said circuitry consists of at least one iteration of rank i, starting from the rank i=0 for which the portal register of order 0 is selected, whereby the iteration of rank i comprises the steps of:

reading data in a cell of the register of order i selected, denoted by the (i+1)-th slice of K bits in the string analysed;

if the data read contains a continue analysis pointer, selecting a register of order i+1 of the TRIE memory as indicated by said pointer, the sequence associated with the register of order i+1 selected being formed by the first (i+1)K bits of the string analysed, then running the iteration of rank i+1;

if the data read represents end analysis data and contains no continue analysis pointer, terminating the analysis by issuing a reference contained in said end analysis data, and wherein the updating means are arranged to store the data in the cells of the TRIE memory in response to commands to insert and delete binary patterns of variable length each associated with a reference, so that when a bit string is being analysed by said circuitry, the reference issued is that associated with the longest of the binary patterns matching the start of the string analysed.

15. A processing device as claimed in claim 14, wherein the updating means comprise a mirror table, made up of registers of $2^K$ cells, wherein each register of the mirror table corresponds to a respective register of the TRIE memory allocated to the portal register, wherein each of the $2^K$ cells of a register in the mirror table corresponds to a respective cell in the corresponding register of the TRIE memory, and wherein each cell in the mirror table corresponding to a non-empty cell of the TRIE memory contains at least:

information indicating whether said corresponding non-empty cell of the TRIE memory contains a continue analysis pointer;

if said corresponding non-empty cell of the TRIE memory contains a continue analysis pointer, the continue analysis pointer in question;

if said corresponding non-empty cell of the TRIE memory does not contain a continue analysis pointer but a reference, the length of a binary pattern associated with said reference.

16. A processing device as claimed in claim 15, wherein each cell of the mirror table corresponding to a non-empty cell of a register of order $i \geq 0$ of the TRIE memory further contains:

information indicating whether said corresponding non-empty cell of the TRIE memory is ghosted, i.e. whether, for at least one integer depth D such that $0 \leq D < K$, a pattern of (i+1)K–D bits has been inserted, the first iK bits of which form the sequence associated with said register of order i and the last K–D bits of which correspond to the first K–D of the K bits denoting said corresponding cell of the TRIE memory within said register of order i.

17. A processing device as claimed in claim 16, wherein the updating means comprise a ghost table for storing the references associated with the binary patterns inserted and wherein, for each ghosted cell of a register of order $i \geq 0$ of the TRIE memory, the ghost table stores each reference associated with an inserted pattern of (i+1)K–D bits, such that $0 \leq D < K$, the first iK bits of which form the sequence associated with said register of order i and the last K–D bits of which correspond to the first K–D of the K bits denoting said ghosted cell of the TRIE memory within said register of order i.

18. A precessing device as claimed in claim 17, wherein the updating means are arranged to look up the ghost table to obtain, relative to a ghosted cell of a register of order i of the TRIE memory, the reference associated with the inserted pattern of (i+1)K–D bits having a minimum depth D, the first iK bits of which form the sequence associated with said register of order i and the last K–D bits of which correspond to the first K–D bits of the K bits denoting said cell in the TRIE memory within said register of order i.

19. A processing device as claimed in claim 18, wherein the ghost table has, for each register of order i of the TRIE memory having at least one ghosted cell and for each depth D such that $0 \leq D < K$, $2^{K-D}$ memory locations containing respectively, as applicable, the references associated with the inserted patterns of (i+1)K–D bits, the first iK bits of which form the sequence associated with said register of order i, and wherein, to obtain a reference relating to a ghosted cell of a register or order i of the TRIE memory, the updating means are arranged to run the following step, for the depths D increasing from D=0 until a reference is returned:

if one of the $2^{K-D}$ memory locations contained in the ghost table for said register of order i contains a reference associated with an inserted pattern of (i+1) K–D bits, the first iK bits of which form the sequence associated with said register of order i and the last K–D bits of which correspond to the first K–D bits of the K bits denoting said ghosted cell of the TRIE memory within said register of order i, returning said reference and the depth D.

20. A processing device as claimed in claim 17, wherein the ghost table has, for each register of order i of the TRIE memory having at least one ghosted cell and for each depth D such that $0 \leq D < K$, $2^{K-D}$ memory locations containing respectively, as applicable, the references associated with the inserted patterns of (i+1)K−D bits, the first iK bits of which form the sequence associated with said register of order i.

21. A processing device as claimed in claim 17, wherein the updating means are arranged to run the following operations in response to a command to insert a first pattern of L=MK+B bits associated with a first reference, M and B being integers such that $M \geq 0$ and $1 \leq B \leq K$:

selecting the portal register of order 0;

if M>0, proceeding with the following steps /a/ to /e/ for each of the values of the rank i increasing from 0 to M−1:

/a/ reading the data in a first cell of the mirror table corresponding to the cell of the TRIE memory indicated by the (i+1)-th slice of K bits of the first pattern within the register of order i selected;

/b/ if the data read in the first cell indicates that said corresponding cell of the TRIE memory contains a continue analysis pointer, selecting the register of the TRIE memory designated by said pointer as the register of order i+1;

/c/ if the data read in the first cell indicates that said corresponding cell of the TRIE memory does not contain a continue analysis pointer, selecting a register available in the TRIE memory as a register of order i+1, writing in said corresponding cell of the TRIE memory a continue analysis pointer designating the selected register of order i+1 and writing in the first cell of the mirror table an indication that said corresponding cell of the TRIE memory contains a continue analysis pointer as well as said pointer;

/d/ if a second reference, associated with a second binary pattern, was previously obtained, writing said second reference in each non-ghosted cell of the TRIE memory belonging to the register of order i selected and not containing a pointer and write the length of said second binary pattern in each corresponding cell of the mirror table;

/e/ if the data read in the first cell indicates that said corresponding cell of the TRIE memory is ghosted, obtaining from the ghost table a second reference associated with a second binary pattern constituted by the inserted pattern of (i+1)K−D bits having a minimum depth D, the first iK bits of which form the sequence associated with the register of order i selected and the last K−D bits of which correspond to the first K−D bits of the K bits denoting said ghosted cell within the register of order i selected;

proceeding with the following steps /f/ to /j/ for each slice of K bits of the form $2^{K-B}V_M+Z$ where $V_M$ is the number formed by the last B bits of the first pattern and Z is an integer ranging between 0 and $2^{K-B}-1$:

/f/ reading data in a second cell of the mirror table corresponding to the cell of the TRIE memory denoted by said slice $2^{K-B}V_M+Z$ within the register of order M selected;

/g/ if the data read in the second cell indicates that the corresponding cell of the TRIE memory is ghosted, obtaining from the ghost table the length of the inserted pattern of (M+1)K−D bits having a minimum depth D, the first MK bits of which form the sequence associated with the register of order M selected and the last K−D bits of which correspond to the first K−D bits of the K bits designating said ghosted cell within the register of order M selected and do not run steps /h/ to /j/ if the depth obtained is less than K−B;

/h/ if the data read in the second cell indicates that the corresponding cell of the TRIE memory is not ghosted, writing in the second cell of the mirror table an indication that the corresponding cell of the TRIE memory is ghosted;

/i/ if the data read in the second cell indicates that the corresponding cell of the TRIE memory contains a continue analysis pointer, recursively propagating the first reference associated with the first binary pattern starting from the register designated by said continue analysis pointer;

/j/ if the data read in the second cell indicates that the corresponding cell of the TRIE memory does not contain a continue analysis pointer, writing said first reference in said corresponding cell of the TRIE memory and write the length of said first binary pattern in the second cell of the mirror table;

writing in the ghost table the first reference, in relation with the depth K−B for each cell of the TRIE memory designated by a slice of K bits of the form $2^{K-B}V_M+Z$, where Z is an integer ranging between 0 and $2^{K-B}-1$; and running step /d/ for the rank i=M.

22. A processing device as claimed in claim 17, wherein the updating means are arranged to perform the following steps for each slice of K bits, to recursively propagate a first reference associated with a first binary pattern starting from a given register of the TRIE memory:

reading data in the cell of the mirror table corresponding to the cell of the TRIE memory designated by said slice of K bits within said register;

if the data read indicates that the cell of the TRIE memory designated by said slice of K bits within said register is not ghosted, does not contain a continue analysis pointer and does not contain a reference associated with a binary pattern longer than the first binary pattern, writing said first reference in the cell of the TRIE memory designated by said slice of K bits within said register and writing the length of said first binary pattern to the corresponding cell of the mirror table;

if the data read in the third cell indicates that the cell of the TRIE memory designated by said slice of K bits within said register is not ghosted and contains a continue analysis pointer, recursively propagating the first reference (S') associated with the first binary pattern starting from the register designated by said continue analysis pointer (Ptr(C)).

23. A processing device as claimed in claim 17, wherein the updating means are arranged to run a recursive procedure, starting from rank i=0 for which the portal register of order 0 is selected, in response to a command to delete a first pattern of L=MK+B bits associated with a first reference, where M and B are integers such that $M \geq 0$ and $1 \leq B \leq K$, whereby said recursive procedure comprises nested iterations for the ranks $i \geq 0$ and each iteration of rank $i \geq 0$ comprises the operations of:

if i<M, proceeding with the following steps /a'/ to /h'/:

/a'/ selecting for the rank i a first cell of the mirror table corresponding to the cell of the TRIE memory denoted by the (i+1)-th slice of K bits of the first pattern within the register of order i selected and reading data in the first cell selected for rank i;

/b'/ if the data read in the first cell selected for rank i indicates that the corresponding cell of the TRIE memory is ghosted, obtaining from the ghost table a second reference associated with a second binary pattern constituted by the inserted pattern of (i+1) K−D bits having a minimum depth D, the first iK bits of which form the sequence associated with the register of order i selected and the last K−D bits of which correspond to the first K−D bits of the K bits denoting said ghosted cell within the register of order i selected;

/c'/ selecting as a register of order i+1 a register of the TRIE memory designated by a continue analysis pointer included in the data read;

/d'/ performing the iteration of rank i+1;

/e'/ writing in the first cell of the mirror table selected for the rank i an indication that the corresponding cell of the TRIE memory does not contain a continue analysis pointer;

/f'/ if a second reference associated with a second binary pattern was previously obtained, writing said second reference in the cell of the TRIE memory corresponding to the first cell selected for rank i and write the length of said second binary pattern in the first cell selected for rank i;

/g'/ if no second reference was previously obtained, writing in the first cell selected for rank i an indication that the corresponding cell of the TRIE memory is empty;

/h'/ if i>0 and each cell of the register of the mirror table corresponding to the register of order i selected indicates that the corresponding cell of the TRIE memory does not contain a continue analysis pointer and is not ghosted, making the register of order i selected available;

if i=M, deleting the reference associated with the first binary pattern of the ghost memory for the cell of the TRIE memory denoted by the slice of K bits $2^{K-B}V_M$ from the register of order M selected for the rank M where $V_M$ is the number formed by the last B bits of the first pattern and proceed with the following steps /i'/ to /l'/ for each cell of the TRIE memory designated by a slice of K bits of the form $2^{K-B}V_M+Z$, where Z is an integer ranging between 0 and $2^{K-B}-1$:

/i'/ looking up the ghost table to determine whether it contains, for said cell denoted by the slice $2^{K-B}V_M+Z$, at least one reference associated with a third binary pattern of a depth at least equal to K−B and, as applicable, selecting the third binary pattern of minimum depth;

/j'/ if the ghost table does not contain a reference for said cell denoted by the slice $2^{K-B}V_M+Z$, writing in the corresponding cell of the mirror table an indication that said cell denoted by the slice $2^{K-B}V_M+Z$ is not ghosted and, if a second reference associated with a second binary pattern was previously obtained, selecting said second binary pattern as the third binary pattern;

/k'/ if a third binary pattern has been selected and if said cell designated by the slice $2^{K-B}V_M+Z$ contains a continue analysis pointer according to the data read in the corresponding cell of the mirror memory, recursively propagating a third reference associated with the selected third binary pattern starting from the register designated by said continue analysis pointer, taking account of the length of the first binary pattern;

/l'/ if a third binary pattern has been selected and if said cell designated by the slice $2^{K-B}V_M+Z$ does not contain a continue analysis pointer according to the data read in the corresponding cell of the mirror memory, writing in the cell of the TRIE memory denoted by said slice $2^{K-B}V_M+Z$ a third reference associated with the third binary pattern selected and writing the length of the selected third binary pattern in the corresponding cell of the mirror table.

24. A processing device as claimed in claim 23, wherein the updating means are arranged to perform the following steps for each slice of K bits, to recursively propagate a third reference associated with a third binary pattern starting from a given register of the TRIE memory, taking account of the length of the first binary pattern:

reading the data in the cell of the mirror table corresponding to the cell of the TRIE memory designated by said slice of K bits within said register;

if the data read indicates that the cell of the TRIE memory designated by said slice of K bits within said register is not ghosted, does not contain a continue analysis pointer and does not contain a reference associated with a binary pattern longer than the first binary pattern, writing said third reference in the cell of the TRIE memory designated by said slice of K bits within said register and writing the length of said third binary pattern in the corresponding cell of the mirror table;

if the data read indicates that the cell of the TRIE memory designated by said slice of K bits within said register is not ghosted and contains a continue analysis pointer, recursively propagating the third reference associated with the third binary pattern starting from the register designated by said continue analysis pointer, taking account of the length of the first binary pattern.

25. A processing device as claimed in claim 23, wherein, for each rank i<M, if the data read in step /a'/ indicates that the cell of the TRIE memory corresponding to the first cell selected for rank i does not contain a continue analysis pointer, the updating means terminate the recursive process by indicating an error.

26. A processing device as claimed in claim 23, wherein, before deleting the reference associated with the first binary pattern from the ghost memory for the cell of the TRIE memory designated by the slice of K bits $2^{K-B}V_M$ from the register of order M selected for rank M, the contents of the ghost table in respect of said cell are read at depth K−B and if said contents do not correspond to a reference or correspond to a different reference from that associated with the first binary pattern, the recursive process is terminated by indicating an error.

27. A processing device as claimed in claim 14, wherein the updating means comprise a management interface receiving commands from said circuitry to insert and delete patterns, a processor running the update procedures in accordance with the insert and delete commands received by the management interface and an auxiliary memory having a mirror table reflecting the contents of the TRIE memory, the processor accessing the auxiliary memory as part of the update procedures, and returning update commands to the analysis circuit via the management interface.

28. A processing device as claimed in claim 27, wherein the auxiliary memory further comprises a ghost table storing the references associated with the binary patterns inserted, each reference being stored in the ghost table at a location corresponding to the cell of the TRIE memory where it would be contained if the associated binary pattern were the only pattern inserted in the TRIE memory.

29. A processing device as claimed in claim 14, wherein the packets analysed are ATM cells.

* * * * *